(12) United States Patent
Kobayashi

(10) Patent No.: US 11,353,704 B2
(45) Date of Patent: Jun. 7, 2022

(54) HEAD MOUNTED DEVICE (HMD) COUPLED TO SMARTPHONE EXECUTING PERSONAL AUTHENTICATION OF A USER

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/791,207

(22) Filed: Feb. 14, 2020

(65) Prior Publication Data

US 2020/0264437 A1 Aug. 20, 2020

(30) Foreign Application Priority Data

Feb. 18, 2019 (JP) .............................. JP2019-026767

(51) Int. Cl.
| G02B 27/01 | (2006.01) |
| G06F 3/041 | (2006.01) |
| G06F 1/16 | (2006.01) |
| G06F 21/31 | (2013.01) |
| G09G 5/00 | (2006.01) |

(52) U.S. Cl.
CPC ....... G02B 27/0172 (2013.01); G06F 1/1626 (2013.01); G06F 3/041 (2013.01); G06F 21/31 (2013.01); G09G 5/006 (2013.01); G02B 2027/0178 (2013.01); G09G 2370/06 (2013.01)

(58) Field of Classification Search
CPC .............. G02B 27/017; G02B 27/0172; G02B 27/0179; G02B 2027/0174; G02B 2027/0178; G02B 2027/0181; G02B 2027/0187; G06F 21/30; G06F 21/31; G06F 21/32; G06F 21/305
USPC .......................................................... 345/7–9
See application file for complete search history.

(56) References Cited

U.S. PATENT DOCUMENTS

| 11,178,344 | B2* | 11/2021 | Kobayashi | .......... H04N 5/23293 |
| 2006/0250218 | A1* | 11/2006 | Kondo | ............... G06K 9/00597 340/5.82 |
| 2011/0304648 | A1* | 12/2011 | Kim | ........................ G06F 3/016 345/633 |
| 2013/0004016 | A1* | 1/2013 | Karakotsios | ........... G06V 40/28 382/103 |
| 2014/0059674 | A1* | 2/2014 | Sun | ........................ G06F 21/31 726/19 |
| 2014/0071041 | A1* | 3/2014 | Fujimaki | ................. G06F 3/017 345/156 |

(Continued)

FOREIGN PATENT DOCUMENTS

JP 2015-197694 A 11/2015

*Primary Examiner* — Alexander Eisen
*Assistant Examiner* — Nelson Lam
(74) *Attorney, Agent, or Firm* — Oliff PLC

(57) ABSTRACT

The present disclosure provides a display system including a HMD mounted on a head of a user and a smartphone coupled to the HMD. The smartphone includes a touch sensor configured to accept a position input operation to detect coordinates of an operational position, a first sensor configured to detect a motion of the user with respect to the smartphone, and a first execution unit configured to execute personal authentication of the user based on a detection result of the first sensor until the user starts the position input operation.

8 Claims, 12 Drawing Sheets

(56) References Cited

U.S. PATENT DOCUMENTS

| | | | | |
|---|---|---|---|---|
| 2015/0168729 A1* | 6/2015 | Kobayashi | ............... | G06F 3/012 |
| | | | | 345/156 |
| 2015/0212681 A1* | 7/2015 | Shinozaki | ................ | G06F 1/163 |
| | | | | 345/8 |
| 2016/0077340 A1* | 3/2016 | Yajima | ................... | G06T 1/0021 |
| | | | | 345/8 |
| 2016/0202486 A1* | 7/2016 | Fujimaki | ............... | G06F 3/0304 |
| | | | | 726/19 |
| 2017/0324726 A1* | 11/2017 | Alleau | ..................... | G06F 3/167 |
| 2018/0285636 A1* | 10/2018 | Fei | ...................... | G06K 9/00375 |
| 2018/0314323 A1* | 11/2018 | Mikhailov | ............ | G02B 27/017 |
| 2019/0114458 A1* | 4/2019 | Cho | ...................... | G06V 10/145 |
| 2019/0266318 A1* | 8/2019 | Tomizawa | .............. | G06F 21/36 |
| 2019/0340421 A1* | 11/2019 | Boenapalli | ........... | H04N 5/2256 |
| 2019/0340817 A1* | 11/2019 | Bostick | ..................... | G06F 8/30 |

\* cited by examiner

HEAD MOUNTED DEVICE (HMD) COUPLED TO SMARTPHONE EXECUTING PERSONAL AUTHENTICATION OF A USER

The present application is based on, and claims priority from JP Application Serial Number 2019-026767, filed Feb. 18, 2019, the disclosure of which is hereby incorporated by reference herein in its entirety.

BACKGROUND

1. Technical Field

The present disclosure relates to a display system, a control program for an information processor, and a control method for the information processor.

2. Related Art

It is known that an image displayed on a mobile terminal device such as a smartphone is mirrored on a display device such as HMD (for example, see JP-A-2015-197694).

The mobile terminal device described in JP-A-2015-197694 includes a touch panel and a processor. The processor switches an operation mode of the mobile terminal device from a first mode in which content is displayed on the touch panel and a touch input is received, to a second mode in which the touch input is received without displaying the content on the touch panel, based on configuration information associated with the content. Then, when the operation mode is switched, the content is displayed on the display of the display device.

In the configuration described in JP-A-2015-197694, there is a problem in that it may take time to perform personal authentication of the smartphone.

For example, when a smartphone is set in a sleep state, it is necessary to cause the smartphone to execute a personal authentication process by a method such as inputting an authentication code.

SUMMARY

An aspect of solving the above-described problem is a display system including a display device mounted on a head of a user, and an information processor to which the display device is coupled, wherein the information processor includes a position input unit configured to accept a position input operation to detect coordinates of an operating position, a first sensor configured to detect a motion of the user with respect to the information processor, and a first execution unit configured to execute personal authentication of the user based on a detection result of the first sensor until the user starts the position input operation.

In the display system described above, the information processor may include a regulating unit configured to regulate an input by the user to the display system when personal authentication of the user by the first execution unit fails.

In the display system described above, the information processor includes an accepting unit configured to accept an input of an authentication code when personal authentication of the user fails, and a second execution unit configured to execute personal authentication of the user based on the authentication code, when the personal authentication of the user by the second execution unit is successful, the regulating unit may release regulation of the input by the user to the display system.

In the display system described above, the information processor may include a storage unit configured to store a profile data set of motions of the user with respect to the information processor detected by the first sensor, and the first execution unit may execute personal authentication of the user based on the profile data set.

In the display system described above, the information processor may include a machine-learning unit configured to learn identification information of each of a plurality of users including the user, based on a profile data set of motions, with respect to the information processor, of each of the plurality of users, and an output unit configured to cause the machine-learning unit to output identification information corresponding to a detection result of the first sensor until the user starts the position input operation, and the first execution unit may execute personal authentication of the user based on the identification information output by the output unit.

In the display system described above, the first sensor may include an illuminance sensor, and the first execution unit may execute personal authentication of the user based on a detection result of the first sensor, from the illuminance detected by the illuminance sensor reaches a threshold illuminance or greater until when the user starts the position input operation.

In the display system described above, the first sensor may include at least one of an acceleration sensor, a gyro sensor, and a geomagnetic sensor, and the first sensor may detect a movement of the information processor until the user starts the position input operation.

In the display system described above, the display device may include a second sensor configured to detect a motion of the user with respect to the information processor, and the first execution unit may execute personal authentication of the user based on a detection result of the first sensor and a detection result of the second sensor.

In the display system described above, the second sensor may include at least one of an acceleration sensor, a gyro sensor, and a geomagnetic sensor, and the second sensor may detect a movement of the head of the user.

In the display system described above, the second sensor may include an image sensor configured to image an external scene, and the first execution unit may detect a position of the user's finger grasping the information processor, based on an image generated by the imaging sensor.

Another aspect of solving the above-described problems is a non-transitory computer-readable storage medium storing a control program for an information processor to which a display device mounted on a head of a user is coupled. The information processor includes a position input unit configured to accept a position input operation to detect coordinates of an operating position, a sensor configured to detect a motion of a user with respect to the information processor, and a computer, and that is coupled to a display device mounted on a head of a user, wherein the control program causes the computer to function as an execution unit configured to execute personal authentication of the user based on a detection result of the sensor until the user starts the position input operation.

Yet another aspect of solving the above-described problems is a control method for an information processor to which a display device mounted on a head of a user is coupled. The information processor includes a position input unit configured to accept a position input operation to detect coordinates of an operating position, a sensor configured to detect a motion of a user with respect to the information processor, and a computer, wherein the control method includes an execution step for executing personal authentication of the user based on a detection result of the sensor until the user starts the position input operation.

DESCRIPTION OF EXEMPLARY EMBODIMENTS

Exemplary embodiments are described below with reference to the accompanying drawings.

1. Configuration of Display System 1-1. Overall Configuration of Display System

Figure 1:
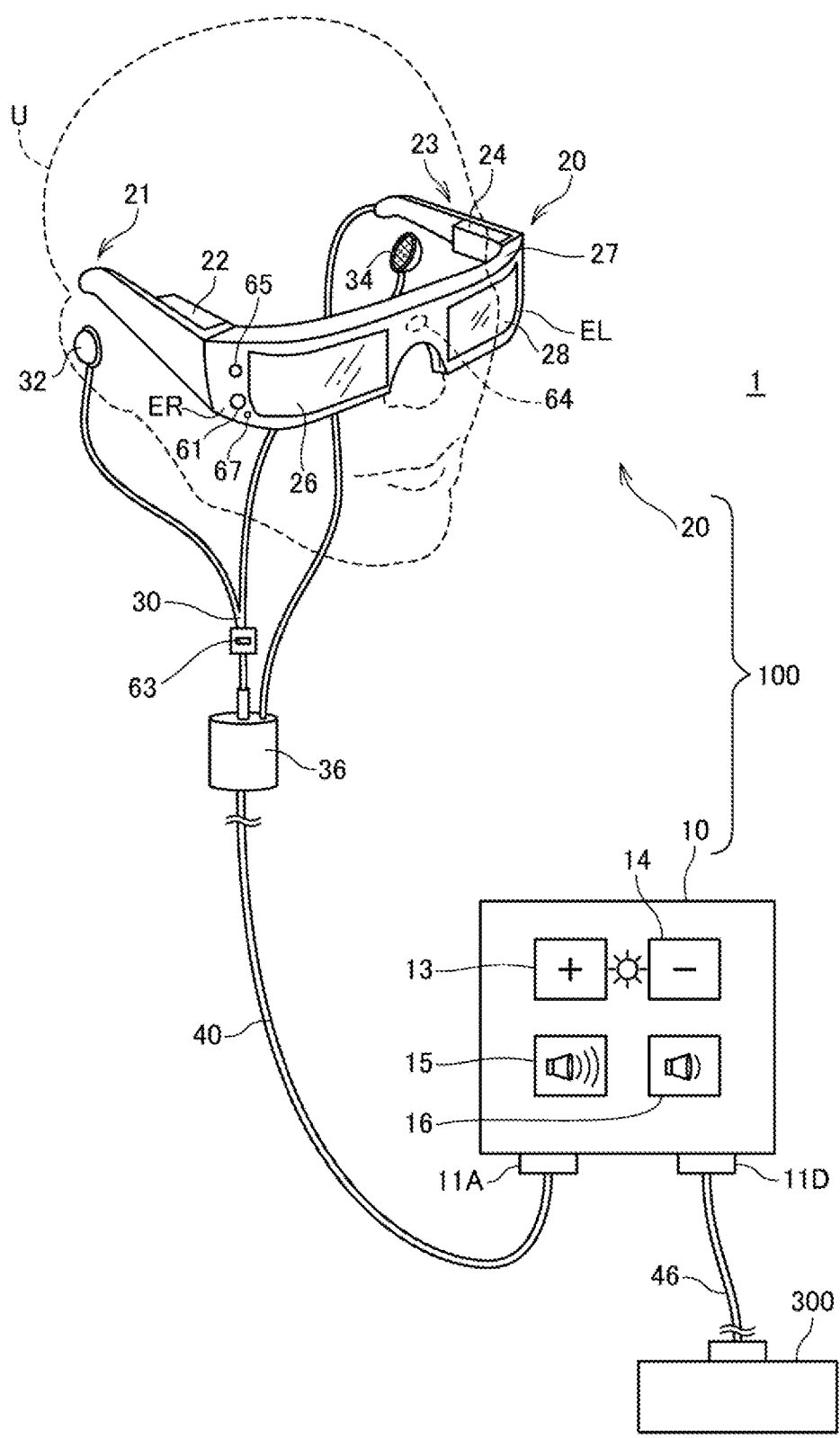
FIG. 1 is a diagram illustrating a configuration of a display system.

FIG. 1 is a diagram illustrating a schematic configuration of a display system 1.

As illustrated in FIG. 1, the display system includes a Head Mounted Display (HMD) 100. The HMD 100 is a device including an image display unit 20 mounted on a head of a user and a coupling device 10, and is a device for causing a virtual image to be visually recognized by the user while mounted on the head of the user. The HMD 100 corresponds to an example of "display device". In the following description, the user refers to a user who wears and uses the HMD 100.

The coupling device 10 includes a connector 11A and a connector 11D in a box-shaped case. The image display unit 20 is coupled to the connector 11A via a coupling cable 40. Hereinafter, when the connectors 11A and 11D are not distinguished, the connectors 11A and 11D may be referred to as connectors 11. The case of the coupling device 10 can be referred to as a housing or a main body.

The display system 1 is a system configured by coupling a smartphone 300 to the HMD 100. The connector 11D is, in the HMD 100, an interface to which the smartphone 300 is coupled. That is, in the present exemplary embodiment, the smartphone 300 is coupled to the connector 11D. The smartphone 300 corresponds to an example of "information processor".

Note that, the smartphone 300 is only one example of an information processor. The information processor may be portable by the user, and may include a display unit configured to display images, a position input unit such as a touch sensor, a sensor configured to detect a motion of the user with respect to the information processor, and a computer. For example, as an information processor, a PDA (Personal Digital Assistant) terminal, a tablet personal computer, or the like can be coupled to the coupling device 10.

The connectors 11 are wired interfaces to be coupled to a communication cable, and the coupling device 10 is coupled to an external device via the communication cable. The connector 11A includes a terminal configured to couple the coupling cable 40 to an interface circuit configured to transmit and receive a signal via the connector 11A.

The connector 11A is provided to couple the image display unit 20 to the coupling device 10. The coupling cable 40 is configured to supply power from the coupling device 10 to the image display unit 20, and the image display unit 20 and the coupling device 10 transmit and receive data to and from each other.

The connector 11D is an interface capable of inputting image data from the smartphone 300 and outputting sensor data to the smartphone 300. The smartphone 300 regenerates content data recorded in a non-volatile storage. For example, the connector 11D is a connector conforming to a known communication interface standard.

In the present exemplary embodiment, as an example, the connector 11D is an interface corresponding to input/output of image data and various types of data, and is coupled to the smartphone 300 via a USB cable 46.

For example, a connector of a USB (Universal Serial Bus)-Type C standard can be adopted as the connector 11D. The interface corresponding to the USB-Type C is capable of transmitting data according to a USB 3.1 standard and supplying a DC power within 20 volts and 5 amperes.

Further, as a function of an alternative mode of USB-Type C, image data of HDMI (High Definition Multimedia Interface) standard, image data of MHL (Mobile High-definition Link) standard, and the like can be transmitted. The smartphone 300 can provide power supply, transmission and reception of data, and supply of streaming data for image and audio via the USB cable 46. The alternative mode of USB-Type C is known as Alternative mode. HDMI is a registered trademark.

The image display unit 20 has an eyeglasses-like shape in the present exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. One of the ends of the front frame 27, which lies on the right side of the user U when the user wears the image display unit 20, is referred to as an end ER, while the other one of the ends, which lies on the left side, is referred to as an end EL. The right holding part 21 extends from the end ER of the front frame 27 to a position corresponding to the right side of the head of the user in a state where the user wears the image display unit 20. The left holding part 23 extends from the end EL to a position corresponding to the left side of the head of the user in a state where the user wears the image display unit 20.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20.

The front frame 27 may include a nose pad provided in the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. Further, the right holding part 21 and the left holding part 23 may be coupled to a belt that is fits to the back of the head of the user when the user wears the display unit 20. In this case, the image display unit 20 can be held on the head U of the user by the belt.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located near the right side head part of the user in the mounted state. The left display unit 24 is a unit related to image display by the left light-guiding plate 28, and is provided on the left holding part 23 and is located near the left side head part of the user in the mounted state. Note that, the right display unit 22 and the left display unit 24 may be collectively and simply referred to as a "display driving unit".

The right light-guiding plate 26 and the left light-guiding plate 28 are optical parts formed of a light transmissive resin or the like, and are configured to guide imaging light output by the right display unit 22 and the left display unit 24 to the eyes of the user. The right light-guiding plate 26 and the left light-guiding plate 28 are, for example, prisms.

Imaging light guided by the right light-guiding plate 26 and outside light transmitted through the right light-guiding plate 26 are incident on the right eye of the user. Similarly, the imaging light guided by the left light-guiding plate 28 and the outside light transmitted through the left light-guiding plate 28 are incident on the left eye.

A second illuminance sensor 65 is arranged on the front frame 27 of the image display unit 20. The second illuminance sensor 65 is configured to receive outside light coming from in front of the user wearing the image display unit 20.

A camera 61 is disposed on the front frame 27 of the image display unit 20. The camera 61 is disposed at a position that the outside light transmitted through the right light-guiding plate 26 and the left light-guiding plate 28 is not blocked. In the example of FIG. 1, the camera 61 is arranged on a side of the end ER of the front frame 27, but the camera may also be arranged on a side of the end EL, or may be arranged at a coupling portion between the right light-guiding plate 26 and the left light-guiding plate 28.

The camera 61 corresponds to an example of an "imaging sensor". Further, the camera 61 corresponds to an example of a "second sensor S2".

The camera 61 is a digital camera equipped with an imaging element, such as a Charge Coupled Device (CCD) or a Complementary Metal Oxide Semiconductor (CMOS), and imaging lens and the like. The camera 61 according to the present exemplary embodiment is a monocular camera, but may be a stereo camera.

A Light Emitting Diode (LED) indicator 67 is arranged on the front frame 27. The LED indicator 67 is arranged adjacent to the camera 61 at the end ER and is configured to light up while the camera 61 is operating to notify that the capturing is in progress.

A distance sensor 64 is provided on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light that the light emitted by the light source is reflected by the target object to be measured, for example. Further, the distance sensor 64 may be an ultrasonic wave type distance sensor including a sound source configured to generate ultrasonic waves, and a detector configured to receive the ultrasonic waves reflected by the target object to be measured. Further, the distance sensor 64 may use a laser range scanner. In this case, the distance sensor 64 can measure a wider region including the front of the image display unit 20.

Each of the right display unit 22 and the left display unit 24 of the image display unit 20 is coupled with the coupling device 10. In the HMD 100, the coupling cable 40 is coupled with the left holding part 23, wiring coupled to the coupling cable 40 is laid inside the image display unit 20, and each of the right display unit 22 and the left display unit 24 is coupled to the coupling device 10.

The coupling cable 40 includes an audio connector 36, wherein a headset 30 including a right earphone 32 and a left earphone 34 constituting a stereo headphone, and a microphone 63, is coupled to the audio connector 36. The right earphone 32 is mounted on the right ear of the user and the left earphone 34 is mounted on the left ear of the user. The right earphone 32 and the left earphone 34 can also be referred to as a sound output unit.

The right earphone 32 and the left earphone 34 output a sound based on a sound signal output from the coupling device 10.

The microphone 63 is configured to collect a sound and outputs the sound signal to the coupling device 10. The microphone 63 may be, for example, a monaural microphone or a stereo microphone, or may be a directional microphone or a non-directional microphone.

The coupling device 10 includes a brightness adjustment key 13, a brightness adjustment key 14, a sound volume adjustment key 15, and a sound volume adjustment key 16 as operated parts to be operated by the user. Each of the brightness adjustment key 13, the brightness adjustment key 14, the volume adjustment key 15, and the volume adjustment key 16 is configured by a hardware key. These operated parts are arranged on the surface of the main body of the coupling device 10, and may be operated by fingers of the user, for example.

The brightness adjustment keys 13 and 14 are hardware keys configured to adjust the display brightness of the image displayed by the image display unit 20. The brightness adjustment key 13 is configured to instruct an increase in brightness, and the brightness adjustment key 14 is configured to instruct a reduction in brightness. The volume adjustment keys 15 and 16 are hardware keys configured to adjust volume of the sound output from the right earphone 32 and the left earphone 34. The volume adjustment key 15 is configured to instruct an increase in volume, and the sound volume adjustment key 16 is configured to instruct a reduction in volume.

1-2. Configuration of Optical System of Image Display Unit

Figure 2:
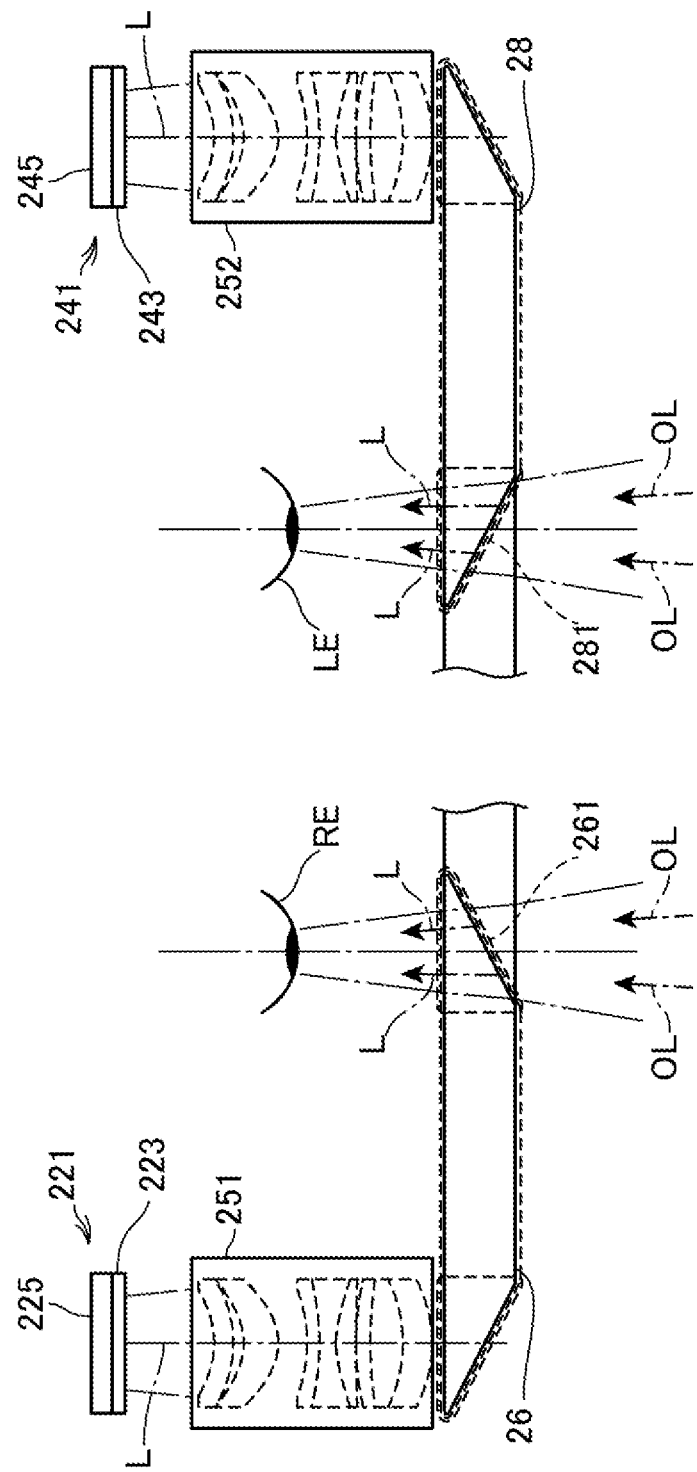
FIG. 2 is a diagram illustrating a configuration of an optical system of an image display unit.

FIG. 2 is a plan view illustrating a main part of a configuration of an optical system included in the image display unit 20. In FIG. 2, a left eye LE and a right eye RE of the user are illustrated for explanation.

As illustrated in FIG. 2, the right display unit 22 and the left display unit 24 are disposed symmetrically on right and left sides. As a configuration where the right eye RE of the user is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission type display panel including light-emitting elements disposed in a matrix and configured to emit light by organic electro-luminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED drive circuit 225 is controlled by a second control unit 120 to select and power the light-emitting elements included in the OLED panel 223 to cause the light-emitting elements of the OLED panel 223 to emit light. The second control unit 120 will be described below with reference to FIG. 4.

Figure 4:
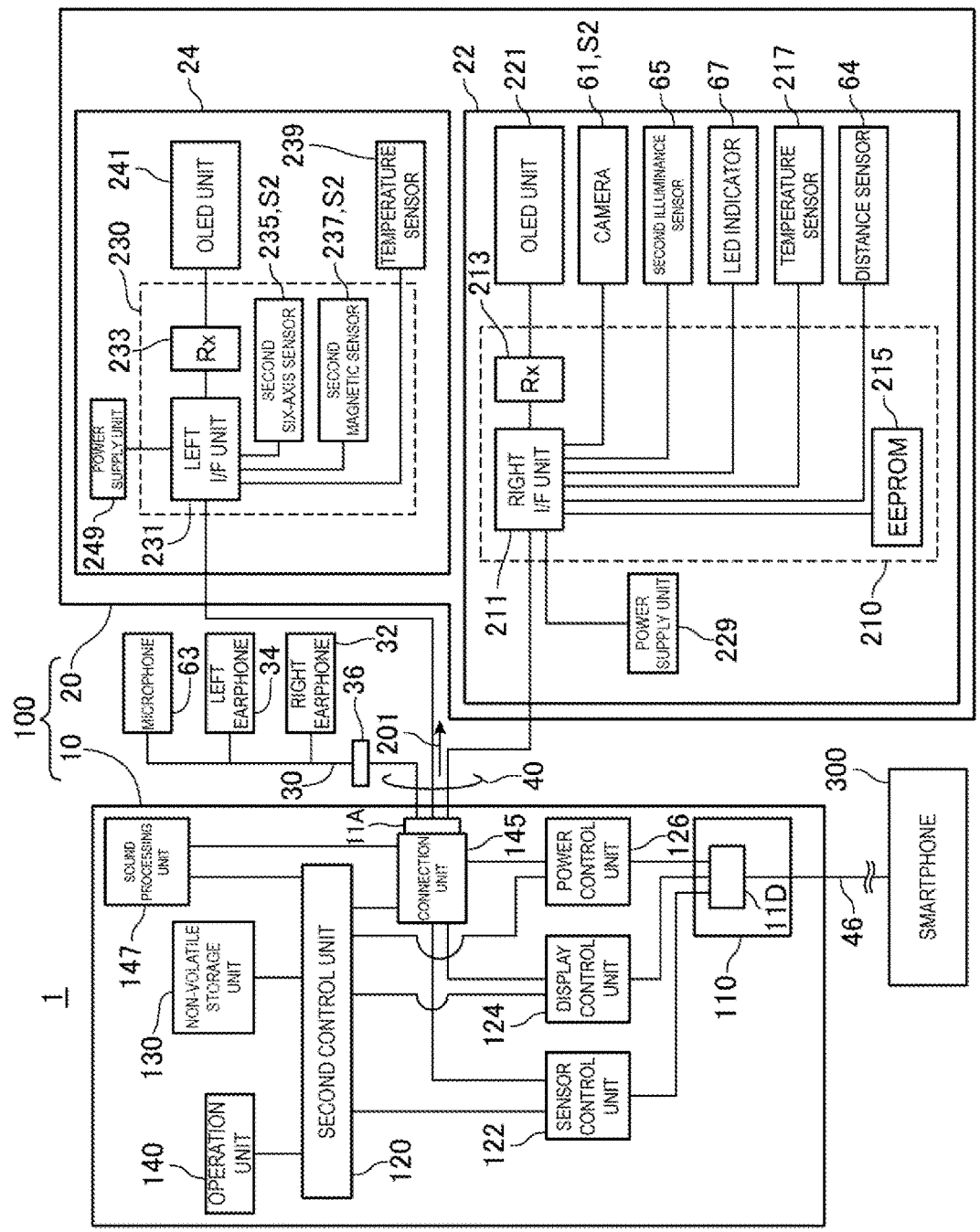
FIG. 4 is a diagram illustrating a configuration of each component configuring a HMD.

The OLED drive circuit 225 is fixed by bonding or the like to a rear face of the OLED panel 223, namely, a back side of a light-emitting surface of the OLED panel 223. The OLED drive circuit 225 may include, for example, a semiconductor device configured to drive the OLED panel 223, and may be mounted on a substrate (not illustrated) fixed to the rear face of the OLED panel 223. A temperature sensor 217 illustrated in FIG. 4 is mounted on this substrate.

Note that, the OLED panel 223 may include a configuration in which light-emitting elements configured to emit white color light are disposed in a matrix, and color filters corresponding to the R color, the G color, and the B color respectively are disposed to overlap the light-emitting elements. Additionally, the OLED panel 223 of a WRGB configuration including light-emitting elements configured to emit white (W) color light may be used, in addition to the light-emitting elements configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image on a retina of the right eye RE, and causes the user to visually recognize the image.

Additionally, as a configuration in which the left eye LE of the user is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission type display panel configured in a manner similar to the OLED panel 223. The OLED drive circuit 245 is instructed by the second control unit 120 to select and power the light-emitting elements included in the OLED panel 243 to cause the light-emitting elements of the OLED panel 243 to emit light.

The OLED drive circuit 245 is fixed by bonding or the like to a rear face of the OLED panel 243, namely, a back side of a light-emitting surface of the OLED panel 243. The OLED drive circuit 245 may include, for example, a semiconductor device configured to drive the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L is formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina of the left eye LE, and causes the user to visually recognize the image.

According to the configuration, the HMD 100 serves as a transmissive display device. Namely, the imaging light L reflected by the half mirror 261 and outside light OL having passed through the right light-guiding plate 26 enter the right eye RE of the user. Additionally, the imaging light L reflected by the half mirror 281 and the outside light OL having passed through the half mirror 281 enter the left eye LE. Accordingly, the HMD 100 overlaps the imaging light L of an image processed internally with the outside light OL, and causes the imaging light L and the outside light OL to overlap and enter the eyes of the user, and the user views an external scene through the right light-guiding plate 26 and the left light-guiding plate 28, and visually recognizes the image that is formed by the imaging light L and that overlaps the external scene.

The half mirrors 261 and 281 are image-extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user. For example, a diffraction grating may be used, or a semi-transmissive reflection film may be used.

Figure 3:
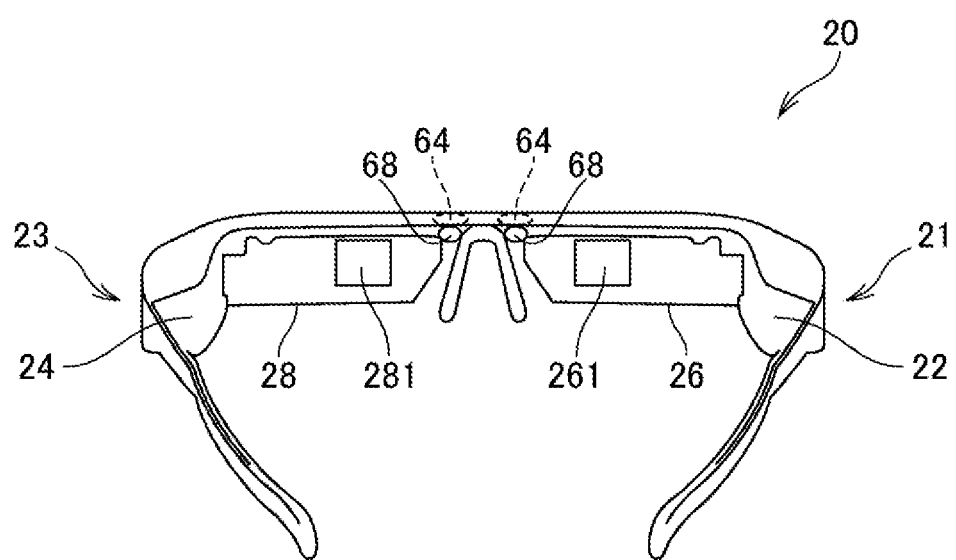
FIG. 3 is a perspective view illustrating a configuration of a main part of the image display unit.

FIG. 3 is a diagram illustrating a configuration of a main part of the image display unit 20. FIG. 3 is a perspective view of the main part of the image display unit 20 seen from a head side of the user. Note that, in FIG. 3, illustration of the coupling cable 40 is omitted.

FIG. 3 illustrates a side contacting the head of the user of the image display unit 20, that is, a side seen from the right eye RE and the left eye LE of the user. In other words, in FIG. 3, back sides of the right light-guiding plate 26 and the left light-guiding plate 28 are visible.

In FIG. 3, the half mirror 261 configured to irradiate the right eye RE of the user with imaging light and the half mirror 281 configured to irradiate the left eye LE with imaging light are visible as approximately square-shaped regions. Further, the outside light, as described above, is transmitted through the entire part of the right light-guiding plate 26 including the half mirror 261 and the entire part of the left light-guiding plate 28 including the half mirror 281. Thus, the user visually recognizes an external scene through all the right light-guiding plate 26 and the left light-guiding plate 28, and visually recognizes rectangular display images at positions of the half mirrors 261 and 281.

Further, inner cameras 68 is arranged on the user side of the image display unit 20. A pair of inner cameras 62 are provided at central positions of the right light-guiding plate 26 and the left light-guiding plate 28 so as to correspond respectively to the right eye RE and the left eye LE of the user. The inner cameras 68 are a pair of cameras that respectively capture images of the right eye RE and the left eye LE of the user. The inner cameras 68 capture images according to instructions from the second control unit 120. The second control unit 120 analyzes the captured image data of the inner cameras 68. For example, the second control unit 120 detects images of reflected lights on the surfaces or pupils of the eyeballs of the right eye RE and the left eye LE, from the captured imaging data of the inner cameras 68, and determines a line-of-sight direction of the user. Further, the second control unit 120 may detect the eyeball movement of each of the right eye RE and the left eye LE, to obtain a change of the line-of-sight direction of the user.

Here, the movement of the line-of-sight of the user can also be regarded as movement of the virtual viewpoint of the user.

When detecting the line-of-sight directions of the right eye RE and the left eye LE from the captured image of the inner camera(s) 68, the second control unit 120 can determine convergence angles of the right eye RE and the left eye LE. The convergence angle PA corresponds to a distance to an object that the user is watching. That is, when the user visually recognizes a stereoscopic image or object, the convergence angle of the right eye RE and the left eye LE is determined according to the distance to the object to be visually recognized. Therefore, by detecting the convergence angle, a distance from the user to the object that is being watched can be determined. Further, by displaying the image so as to guide the convergence angle of the user, a stereoscopic vision can be induced.

1-3. Components Configuration of HMD

FIG. 4 is a diagram illustrating a configuration of components configuring the HMD 100.

The right display unit 22 of the image display unit 20 includes a right display unit substrate 210. On the right display unit substrate 210, a right I/F unit 211 coupled to the coupling cable 40, a receiving unit 213 configured to receive data input from the coupling device 10 via the right I/F unit 211, and an Electrically Erasable Programmable Read Only Memory (EEPROM) 215 are mounted. The right I/F unit 211 couples the receiving unit 213, the EEPROM 215, the temperature sensor 217, the camera 61, the distance sensor 64, the second illuminance sensor 65, the LED indicator 67, and the inner cameras 68 to the coupling device 10. The receiving unit 213 couples the OLED unit 221 to the coupling device 10.

The left display unit 24 includes a left display unit substrate 230. On the left display unit substrate 230, a left I/F unit 231 coupled to the coupling cable 40, and a receiving unit 233 configured to receive data input from the coupling device 10 via the left I/F unit 231 are mounted. Further, on the left display unit substrate 230, a second six-axis sensor 235 and a second magnetic sensor 237 are mounted.

The left I/F unit 231 couples the receiving unit 233, the second six-axis sensor 235, the second magnetic sensor 237, and the temperature sensor 239 to the coupling device 10. The receiving unit 233 couples the OLED unit 241 to the coupling device 10.

I/F is an abbreviation for interface. Note that, in the present exemplary embodiment, the receiving unit 213 and the reception unit 233 may be respectively described as Rx213 and Rx233.

The EEPROM 215 is configured to store various types of data in a non-volatile manner. The EEPROM 215 stores, for example, data relating to light-emitting properties and display properties of the OLED units 221 and 241 included in the image display unit 20, and data relating to properties of sensors included in the right display unit 22 or the left display unit 24.

Specifically, the EEPROM 215 stores parameters regarding gamma correction of the OLED units 221 and 241, data used to compensate for detection values of the temperature sensors 217 and 239, and the like. These types of data are generated by inspection at the time of factory shipment of the HMD 100, and are written into the EEPROM 215. The data stored in the EEPROM 215 is readable for the second control unit 120.

The camera 61 is configured to capture an image according to a signal input via the right I/F unit 211 and output captured image data to the right I/F unit 211.

The second illuminance sensor 65 is configured to receive the outside light and output a detection value corresponding to an amount of the received light or an intensity of the received light. The LED indicator 67 is configured to light up according to a control signal or a driving current input via the right I/F unit 211.

The inner camera(s) 68 is configured to capture an image according to a signal input via the right I/F unit 211 and output captured image data to the right I/F unit 211.

The temperature sensor 217 is configured to detect a temperature of the OLED unit 221, and output a voltage value or a resistance value corresponding to the detected temperature as a detection value.

The distance sensor 64 is configured to execute distance detection, and output a signal indicating a detection result to the coupling device 10 via the right I/F unit 211. As the distance sensor 64, for example, an infrared ray type depth sensor, an ultrasonic type distance sensor, a Time Of Flight type distance sensor, a distance detecting unit configured to combine image detection and sound detection, or the like can be used. Further, the distance sensor 64 may be configured to detect a distance by processing an image obtained by stereo photographing by a stereo camera or a monocular camera.

The receiving unit 213 is configured to receive image data for displaying transmitted from the coupling device 10 via the right I/F unit 211, and output the image data to the OLED unit 221. The OLED unit 221 displays an image based on the image data transmitted by the coupling device 10.

Further, the receiving unit 233 is configured to receive image data for displaying transmitted from the coupling device 10 via the left I/F unit 231, and output the image data to the OLED unit 241. The OLED unit 241 displays an image based on the image data transmitted by the coupling device 10.

The second six-axis sensor 235 is a motion sensor including a three-axis acceleration sensor and a three-axis gyro sensor. As the second six-axis sensor 235, an Inertial Measurement Unit (IMU) including the above-described sensors as modules may be adopted. The second magnetic sensor 237 is a three-axis geomagnetic sensor, for example. A gyro sensor is also referred to as an angular velocity sensor. In the following description, a three-axis acceleration sensor of the second six-axis sensor 235 may be referred to as a second acceleration sensor.

Either the second six-axis sensor 235 or the second magnetic sensor 237 corresponds to an example of a "second sensor S2".

The temperature sensor 239 is configured to detect a temperature of the OLED unit 241, and output a voltage value or a resistance value corresponding to the detected temperature as a detection value.

Each component of the image display unit 20 operates with power supplied from the coupling device 10 via the coupling cable 40.

The image display unit 20 includes a power supply unit 229 on the right display unit 22, and a power supply unit 249 on the left display unit 24. The power supply unit 229 is configured to distribute and supply the power supplied by the coupling device 10 via the coupling cable 40 to each component of the right display unit 22 including the right display unit substrate 210. Similarly, the power supply unit 249 is configured to distribute and supply the power supplied by the coupling device 10 via the display unit coupling cable 40 to each component of the left display unit 24 including the left display unit substrate 230. The right display unit 22 and the left display unit 24 may include a conversion circuit or the like configured to convert a voltage.

The coupling device 10 includes an I/F unit 110, a second control unit 120, a sensor control unit 122, a display control unit 124, a power control unit 126, a non-volatile storage unit 130, an operating unit 140, a coupling unit 145, and a sound processing unit 147.

The I/F unit 110 includes connector 11D. Further, the I/F unit 110 includes interface circuits coupled to the connector 11D and configured to execute communication protocols conforming to respective communication standards.

The I/F unit 110 may be, for example, an interface substrate on which the connector 11D and the interface circuit are mounted. Further, a configuration may be adopted in which the second control unit 120, the sensor control unit 122, the display control unit 124, and the power control unit 126 of the coupling device 10 are mounted on a coupling device main substrate (not illustrated). In this case, on the coupling device main substrate, the connector 11D and the interface circuit of the I/F unit 110 may be mounted.

Additionally, the I/F unit 110 may include, for example, an interface for a memory card capable of being coupled to an external storage medium, or the like, or the I/F unit 110 may be configured by a wireless communication interface.

The second control unit 120 is configured to control each component of the HMD 100. The second control unit 120 includes a processor such as a Central Processing Unit (CPU). The second control unit 120 causes the processor to execute a program to control each component of the HMD 100 in cooperation between software and hardware. The second control unit 120 is coupled to the non-volatile storage unit 130, the operating unit 140, the coupling unit 145, and the sound processing unit 147.

The sensor control unit 122 is configured to control the camera 61, the distance sensor 64, the second illuminance sensor 65, the temperature sensor 217, the second six-axis sensor 235, the second magnetic sensor 237, and the temperature sensor 239. Specifically, the sensor control unit 122 is configured to set and initialize a sampling period of each sensor according to the control of the second control unit 120, and execute energization of each sensor, transmission of control data, acquisition of detection values and the like, according to the sampling period of each sensor.

The sensor control unit 122 is coupled to the connector 11D of the I/F unit 110, and is configured to output the data regarding the detection value acquired from each sensor to the connector 11D at a preset timing. The smartphone 300 coupled to the connector 11D can acquire the detection value of each sensor of the HMD 100 and the captured image data of the camera 61.

The display control unit 124 is configured to execute various processes for causing the image display unit 20 to display an image based on the image data input to the I/F unit 110. In the present exemplary embodiment, an image signal output from the smartphone 300 is input to the connector 11D. The image signal is digital image data, but may be an analog image signal.

For example, the display control unit 124 is configured to execute various processes such as frame cutout, resolution conversion, intermediate frame generation, and frame rate conversion. Resolution conversion includes so-called scaling. The display controller 124 is configured to output image data corresponding to each of the OLED unit 221 of the OLED unit 241 to the coupling unit 145. The image data input to the coupling unit 145 is transmitted from the connector 11A to the right I/F unit 211 and the left I/F unit 231 as an image signal 201. The image signal 201 is digital video data processed corresponding to each of the OLED unit 221 and the OLED unit 241.

In the present exemplary embodiment, the connector 11D is configured by a USB-Type C connector. The display control unit 124 receives image data transmitted in an alternative mode of USB-Type C via the connector 11D.

The sensor control unit 122 and/or the display control unit 124 may be realized by cooperation of software and hardware by causing a processor to execute a program. That is, the sensor control unit 122 and the display control unit 124 are configured by a processor to execute the operations described above by executing a program. In this example, the sensor control unit 122 and the display control unit 124 may be realized by a processor configuring the second control unit 120 by executing a program. In other words, the processor may function as the second control unit 120, the display control unit 124, and the sensor control unit 122 by executing a program. Here, the processor can be paraphrased as a computer.

Further, the display control unit 124 and the sensor control unit 122 may be configured by programmed hardware such as a Digital Signal Processor (DSP) or a Field Programmable Gate Array (FPGA), and the like. Further, the sensor control unit 122 and the display control unit 124 may be integrated and configured as a System-on-a-Chip (SoC)-FPGA.

The power control unit 126 is coupled to the connector 11D. The power control unit 126 is configured to, based on power supplied from the connector 11D, supply power to each component of the coupling device 10 and to the image display unit 20. Further, the power control unit 126 may include a voltage conversion circuit (not illustrated), and may be configured to supply the concerted voltage to each component of the coupling device 10 and the image display unit 20. The power control unit 126 may be configured by a programmed semiconductor device such as a logic circuit or FPGA. Further, the power control unit 126 may be configured by hardware common to the sensor control unit 122 and/or the display control unit 124.

The sensor control unit 122, the display control unit 124, and the power control unit 126 may include a work memory for executing data processing, or may use the memory of the second control unit 120 to execute processing.

The operating unit 140 is configured to detect an operation on the operated part included in the coupling device 10 and outputs data indicating an operation content or an operation signal indicating the part to be operated to the second control unit 120.

The sound processing unit 147 is configured to generate a sound signal according to sound data input from the second control unit 120, and output the sound signal to the coupling unit 145. This sound signal is output from the coupling unit 145 to the right earphone 32 and the left earphone 34 via the audio connector 36. Additionally, the sound processing unit 147 is configured to adjust the volume of the sound signal under the control of the second control unit 120. Additionally, the sound processing unit 147 is configured to generate sound data of the sound collected by the microphone 63, and output the sound data to the second control unit 120. The sound data may be processed by the second control unit 120 in the same manner as the detection value of the sensor included in the image display unit 20.

Additionally, the coupling device 10 may include a battery (not illustrated), and may be configured to supply power from the battery to each component of the coupling device 10 and the image display unit 20. The battery included the coupling device 10 may be a rechargeable secondary battery.

1-4. Configuration of Smartphone

Figure 5:
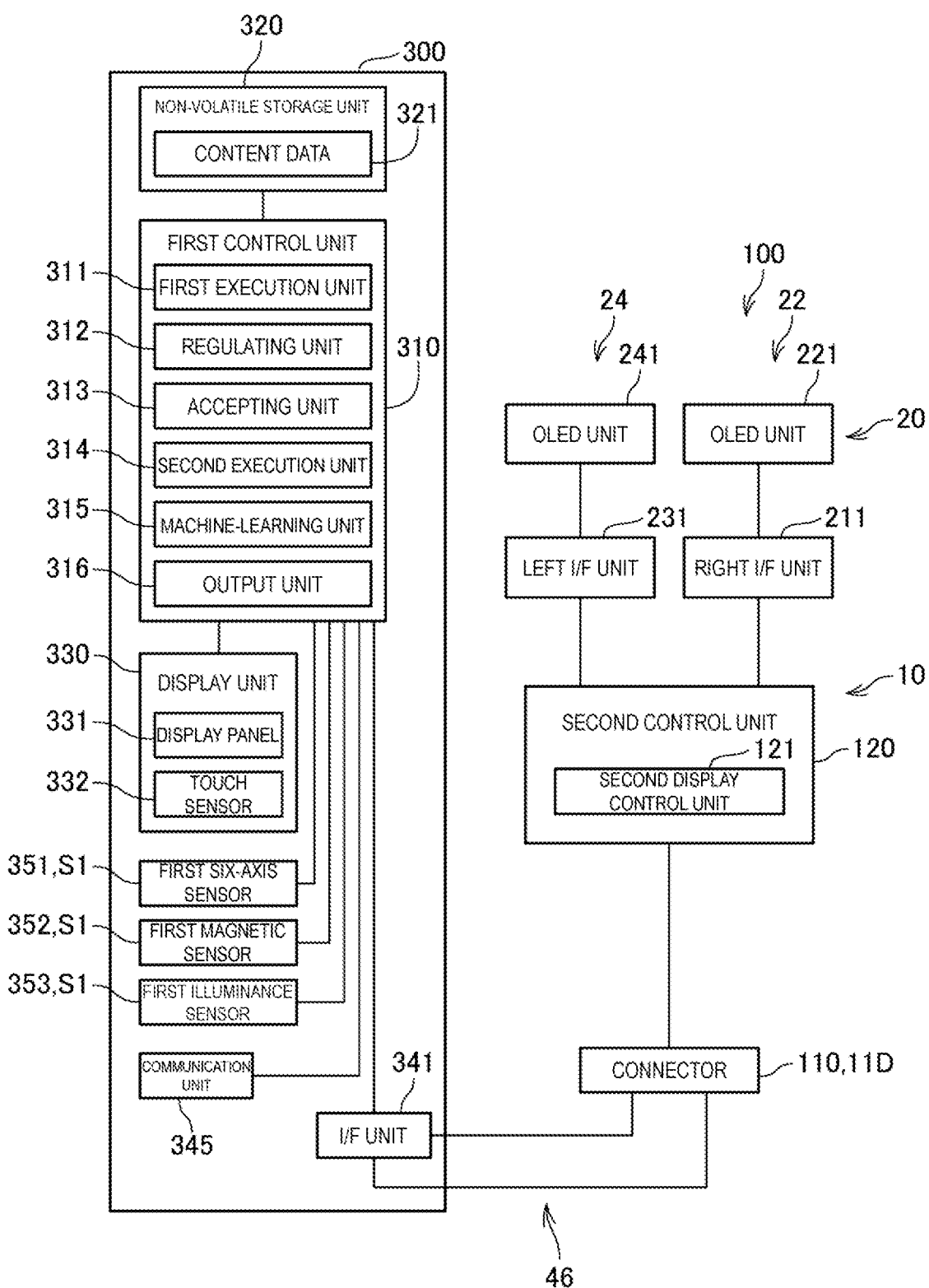
FIG. 5 is a diagram illustrating a configuration of a second control unit of the HMD and a smartphone.

FIG. 5 is a diagram illustrating a configuration of the second control unit 120 of the HMD 100 and the smartphone 300.

The smartphone 300 includes a first control unit 310, a non-volatile storage unit 320, a display unit 330, an I/F unit 341, a communication unit 345, a first six-axis sensor 351, a first magnetic sensor 352, and a first illuminance sensor 353.

The first control unit 310 (electronic device control unit) includes a processor (not illustrated) such as a CPU or a microcomputer, and is configured to control each component of the smartphone 300 by causing the processor to execute a control program. The first control unit 310 may include a Read Only Memory (ROM) configured to store a control program executed by the processor in a non-volatile manner, and a Random Access Memory (RAM) constituting a work area of the processor. The processor corresponds to an example of a "computer". The control program stored in the memory of the first control unit 310 corresponds to an example of a "control program".

The non-volatile storage unit 320 is configured to store, in a non-volatile manner, a program to be executed by the first control unit 310 and data to be processed by the first control unit 310. The non-volatile storage unit 130 is, for example, a magnetic recording device such as a Hard Disk Drive (HDD), or a storage device using a semiconductor storage element such as a flash memory.

The non-volatile storage unit 320 is configured to store, for example, content data 321 of contents including an image. The content data 321 is a file in a format that the first control unit 310 can process, includes image data, and may include sound data.

Additionally, the non-volatile storage unit 320 is configured to store an Operating System (OS) as a basic control program to be executed by the first control unit 310, an application program operating by using the OS as a platform, and the like. Additionally, the non-volatile storage unit 320 is configured to store data to be processed during execution of the application program, data of processing results, and the like.

The non-volatile storage unit 320 corresponds to an example of a "storage unit".

A display panel 331 and a touch sensor 332 included in the display unit 330 are coupled with the first control unit 310. The display panel 331 is configured to display various images based on the control of the first control unit 310. The display panel 331 is configured by, for example, a Liquid Crystal Display (LCD). The display panel 331 is configured in a rectangular shape. In the present exemplary embodiment, the display panel 331 has a rectangular shape.

The touch sensor 332 is configured to detect a touch operation and output data indicating the detected operation to the first control unit 310. The touch sensor 332 is integrally formed with the display panel 331. Specifically, the touch sensor 332 is formed on an image display surface of the display panel 331. In the present exemplary embodiment, the touch sensor 332 has a rectangular shape. The data output by the touch sensor 332 is coordinate data indicating an operating position in the touch sensor 332, or the like.

The touch sensor 332 corresponds to an example of a "position input unit".

The I/F unit 341 is an interface coupled to an external device. For example, the I/F unit 341 is configured to execute communication compliant with standards such as an HDMI interface and a USB interface. The I/F unit 341 includes a connector configured to couple the USB cable 46 and an interface circuit that processes a signal transmitted via the connector. The I/F unit 341 is an interface substrate including a connector and an interface circuit, and is coupled to a main substrate on which a processor of the first control unit 310 is mounted. Alternatively, the connector and the interface circuit constituting the I/F unit 341 are mounted on the main substrate of the smartphone 300.

In the present exemplary embodiment, the I/F unit 341 includes a USB interface, and is coupled to the connector 11D via the USB cable 46. For example, the first control unit 310 is configured to output image data via the USB cable 46, and receive data and the like related to an output value of the sensor from the coupling device 10.

Additionally, the I/F unit 341 may be a wireless communication interface. In this case, the I/F unit 341 can be an interface substrate on which a communication circuit including a Radio Frequency (RF) unit is mounted, or can be a circuit mounted on the main substrate.

The communication unit 345 is a communication interface configured to execute data communication with the external device. The communication unit 345 may be a wired communication interface capable of being coupled with a cable, or may be a wireless communication interface For example, the communication unit 345 may be a wired LAN interface supporting Ethernet (registered trademark), or a wireless LAN interface compatible with IEEE802.11 standard.

The communication unit 345 is, for example, a communication interface that is coupled to another smartphone via a wireless telephone line.

The first six-axis sensor 351 is a motion sensor including a three-axis acceleration sensor and a three-axis gyro sensor. The first six-axis sensor 351 may adopt an IMU in which the sensors described above are provided as a module. The first magnetic sensor 352 is a three-axis geomagnetic sensor, for example. A gyro sensor is also referred to as an angular velocity sensor. In the following description, a three-axis acceleration sensor of the first six-axis sensor 351 may be referred to as a first acceleration sensor.

Either the first six-axis sensor 351 or the first magnetic sensor 352 corresponds to an example of a "first sensor".

The first illuminance sensor 353 is configured to receive the outside light and output a detection value corresponding to an amount of the received light or an intensity of the received light. The first illuminance sensor 353 receives outside light from a normal direction of the display panel 331, for example.

The first illuminance sensor 353 corresponds to an example of a "first sensor".

The first control unit 310 includes a first execution unit 311, a regulating unit 312, an accepting unit 313, a second execution unit 314, a machine-learning unit 315, and an output unit 316. Specifically, the first control unit 310 functions as the first execution unit 311, the regulating unit 312, the accepting unit 313, the second execution unit 314, the machine-learning unit 315, and the output unit 316, by causing the processor included in the first control unit 310 to execute the control program.

The first control unit 310 is configured to regenerate the content data 321, and display a second image PT2 corresponding to the image data included in the content data 321 on the display panel 331 of the display unit 330.

Further, the first control unit 310 transmits data indicating the second image PT2 to the HMD 100. Specifically, the first control unit 310 transmits data indicating the second image PT2 to the second control unit 120 of the HMD 100 via the I/F unit 341 and the connector 11D.

The first execution unit 311 performs personal authentication of the user based on the detection result of the first sensor S1 until the user starts a position input operation with respect to the touch sensor 332. The first sensor S1 detects a motion of the user with respect to the smartphone 300. The first sensor S1 includes the first illuminance sensor 353, the first six-axis sensor 351 and the first magnetic sensor 352.

The first execution unit 311 performs personal authentication of the user based on the detection results of the first sensor S1 and the second sensor S2 until the user starts a position input operation with respect to the touch sensor 332. The second sensor S2 includes the camera 61, the second six-axis sensor 235 and the second magnetic sensor 237. The camera 61 images an external scene and generates an external scene image. The first execution unit 311 detects the position of the user's finger grasping the smartphone 300 based on the external scene image. The second six-axis sensor 235 and the second magnetic sensor 237 detect the movement of the head of the user U.

The first execution unit 311 executes personal authentication of the user based on a profile data set of motions of the user with respect to the smartphone 300. The profile data set indicates the detection result of the first sensor S1. Specifically, the profile data set includes the detection results of the first illuminance sensor 353, the first six-axis sensor 351 and the first magnetic sensor 352.

When the personal authentication of the user executed by the first execution unit 311 fails, the regulating unit 312 regulates the input by the user to the display system 1.

For example, the regulating unit 312 prohibits user input to the touch sensor 332. In addition, for example, the regulating unit 312 prohibits the user input to the brightness adjustment key 13, the brightness adjustment key 14, the volume adjustment key 15, and the volume adjustment key 16 of the HMD 100.

The accepting unit 313 accepts an input of an authentication code from the user when the personal authentication of the user fails. The authentication code is, for example, a four-digit code composed of at least one of an alphabetic character and a number. The accepting unit 313 may accept an input of a authentication pattern in place of the authentication code.

The second execution unit 314 executes personal authentication of the user based on the authentication code.

The machine-learning unit 315 learns identification information of each of a plurality of users including the user, based on a profile data set of motions with respect to the smartphone 300 of each of the plurality of users. The profile data set indicates the detection result of the first sensor S1. Specifically, the profile data set includes the detection results of the first illuminance sensor 353, the first six-axis sensor 351 and the first magnetic sensor 352.

The machine-learning unit 315 executes machine-learning using, for example, deep learning.

The profile data set of motions with respect to the smartphone 300 of each of the plurality of users is stored in, for example, the non-volatile storage unit 320 in association with the identification information of each of the plurality of users.

The machine-learning unit 315 reads the profile data set and the identification information from the non-volatile storage unit 320 for each of the plurality of users, executes machine learning, and generates a learned model.

The learned model is stored, for example, in a memory of the first control unit 310.

The output unit 316 outputs, to the machine-learning unit 315, the identification information corresponding to the detection result of the first sensor S1 relative to the user. Specifically, the output unit 316 outputs, to learned model, the identification information corresponding to the detection result of the first sensor S1 relative to the user.

1-5. Configuration of First Control Unit of HMD

The second control unit 120 of the HMD 100 includes a first display control unit 121. Specifically, the second control unit 120 functions as the first display control unit 121 by causing the processor included in the second control unit 120 to execute a control program.

The first display control unit 121 displays the first image PT1. Specifically, the first display control unit 121 receives the second image PT2 from the smartphone 300, and displays the received second image PT2 as the first image PT1 on the image display unit 20. That is, the first image PT1 matches the second image PT2. In other words, the first image PT1 indicates the same image as the second image PT2. In this case, the image display unit 20 of the HMD 100 displays the same image as the image displayed on the display panel 331, and performs so-called "mirroring display".

More specifically, the first display control unit 121 generates a right image and a left image according to the second image PT2 received from the smartphone 300. Then, the first display control unit 121 displays the right image on the right display unit 22, and displays the left image on the left display unit 24.

More specifically, the first display control unit 121 transmits the right image to the OLED unit 221 via the right I/F unit 211, and displays the right image on the OLED unit 221. Further, the first display control unit 121 transmits the left image to the OLED unit 241 via the left I/F unit 231, and displays the left image on the OLED unit 241.

2. Detection Result of Sensor 2-1. Detection Result of First Sensor

Figure 6:
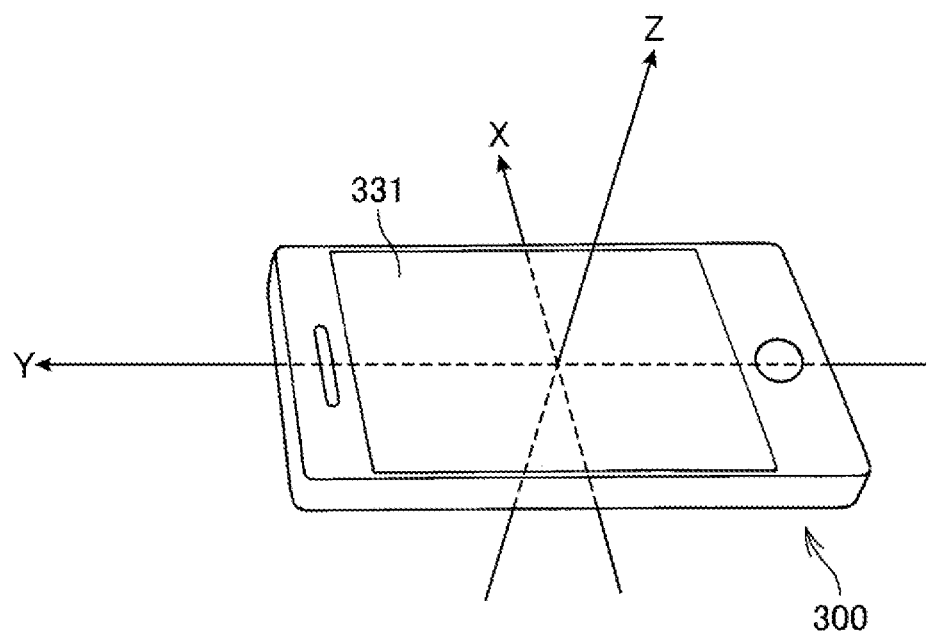
FIG. 6 is a diagram illustrating an example of axis direction of a sensor arranged on the smartphone.

Next, with reference to FIG. 6 to FIG. 8, an example of the detection result of the first sensor S1 will be described. FIG. 6 is a diagram illustrating an example of axis direction of each of the first six-axis sensor 351 and the first magnetic sensor 352 arranged on the smartphone 300.

As illustrated in FIG. 6, the axes of each of the first six-axis sensor 351 and the first magnetic sensor 352 are composed of an X-axis, a Y-axis and a Z-axis that are orthogonal to each other. The positive direction of the Z-axis indicates the normal direction of the display surface of the display panel 331. The Y-axis is parallel to the long side direction of the display panel 331. In addition, the positive direction of the Y-axis indicates the upward direction of the display panel 331. The X-axis is parallel to the short side direction of the display panel 331. The positive direction of the X-axis indicates the right direction of the display panel 331.

Figure 7:
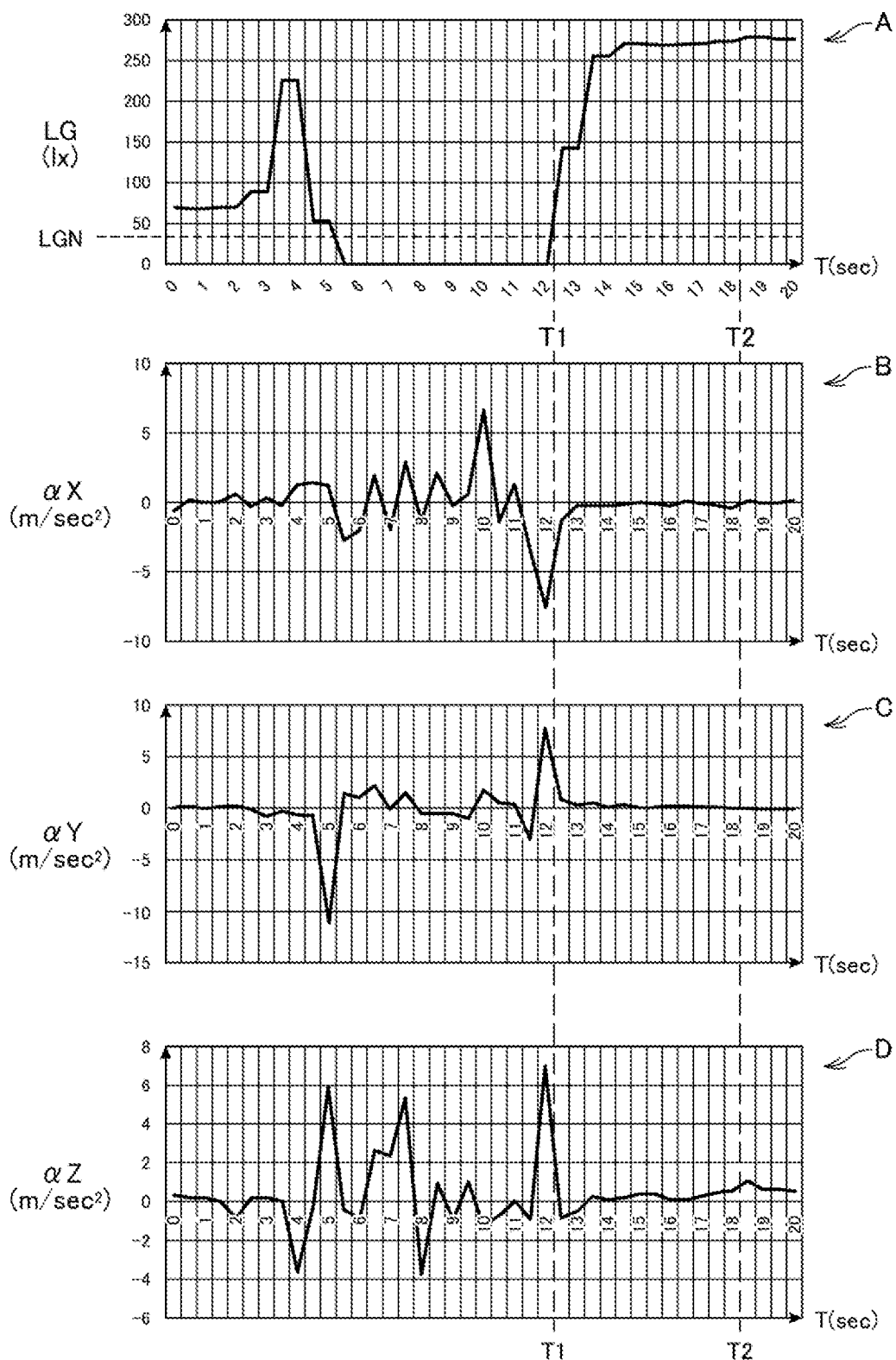
FIG. 7 is a diagram illustrating an example of a detection result of an acceleration sensor.

FIG. 7 is a diagram illustrating an example of a detection result of the first illuminance sensor 353 and the three-axis acceleration sensor of the first six-axis sensor 351.

Sign A in FIG. 7 is a graph illustrating the detection result of the first illuminance sensor 353. Sign B in FIG. 7 is a graph illustrating the detection result of an X-axis acceleration sensor among the three-axis acceleration sensors. Sign C in FIG. 7 is a graph illustrating the detection result of a Y-axis acceleration sensor among the three-axis acceleration sensors. Sign D in FIG. 7 is a graph illustrating the detection results of a Z-axis acceleration sensor among the three-axis acceleration sensors.

The horizontal axis of the graph for each of the sign A in FIG. 7, the sign B in FIG. 7, the sign C in FIG. 7, and the sign D in FIG. 7 indicates time T. The vertical axis of the graph of the sign A in FIG. 7 indicates the illuminance LG. The vertical axis of the graph of the sign B in FIG. 7 indicates the acceleration $\alpha X$ in the X-axis direction. The vertical axis of the graph of the sign C in FIG. 7 indicates the acceleration $\alpha Y$ in the Y-axis direction. The vertical axis of the graph of the sign D in FIG. 7 indicates the acceleration $\alpha Z$ in the Z-axis direction.

As illustrated in the graph of the sign A in FIG. 7, at time T1, the illuminance LG is not less than the threshold illuminance LGN. The threshold illuminance LGN is, for example, 30lx (lux). At a time prior to time T1, the illuminance LG is zero. In the present exemplary embodiment, at a time prior to the time T1, the smartphone 300 is stored in the user's pocket and the smartphone 300 is taken out of the pocket at the time T1.

As illustrated in the graph of the sign A in FIG. 7, the illuminance LG increases from the time T1. The user takes out the smartphone 300 from the pocket into a room where a fluorescent lamp is arranged on a ceiling. Immediately after the smartphone 300 is taken out from the pocket, the normal direction of the display panel 331 is facing in the horizontal direction. Further, the first illuminance sensor 353 receives the outside light from the normal direction of the display panel 331. Therefore, immediately after the smartphone 300 is taken out, the illuminance LG is small.

Thereafter, to operate the touch sensor 332 of the smartphone 300, the user changes the posture of the smartphone 300 such that the normal direction of the display panel 331 of the smartphone 300 faces upward. As a result, the illuminance LG increases.

As illustrated in the graph of the sign D in FIG. 7, at time T2, the acceleration $\alpha Z$ increases. At the time T2, as a result of the user touching the touch sensor 332 of the smartphone 300, the smartphone 300 moves in the Z-axis direction, and the acceleration $\alpha Z$ increases.

As illustrated in the graph of the sign B in FIG. 7, between the time T1 and the time T2, the acceleration $\alpha X$ rapidly increases immediately after time T1, and the subsequent change is small. As illustrated in the graph of the sign C in FIG. 7, between the time T1 and the time T2, the acceleration $\alpha Y$ rapidly decreases immediately after the time T1, and the subsequent change is small. Such changes in the acceleration $\alpha X$ and the acceleration $\alpha Y$ indicate the following motions of the user with respect to the smartphone 300.

That is, immediately after the user took out the smartphone 300 at the time T1, a preparatory operation of the user was performed to operate the touch sensor 332 of the smartphone 300. The preparation operation is an operation in which the user changes the posture of the smartphone 300 such that the normal direction of the display panel 331 of the smartphone 300 is facing the HMD 100.

From the illuminance LG detected by the first illuminance sensor 353 reaches the threshold illuminance LGN or greater until when the user starts the position input operation, the first execution unit 311 acquires the detection result of the three-axis acceleration sensors of the first six-axis sensor 351.

Specifically, the first execution unit 311 acquires the detection result of the three-axis acceleration sensors of the first six-axis sensor 351 from the time T1 to the time T2. The time T1 indicates the time when the illuminance LG reaches the threshold illuminance LGN or greater. The time T2 indicates the time when the user starts the position input operation. The position input operation is, for example, a touch operation with respect to the touch sensor 332.

Figure 8:
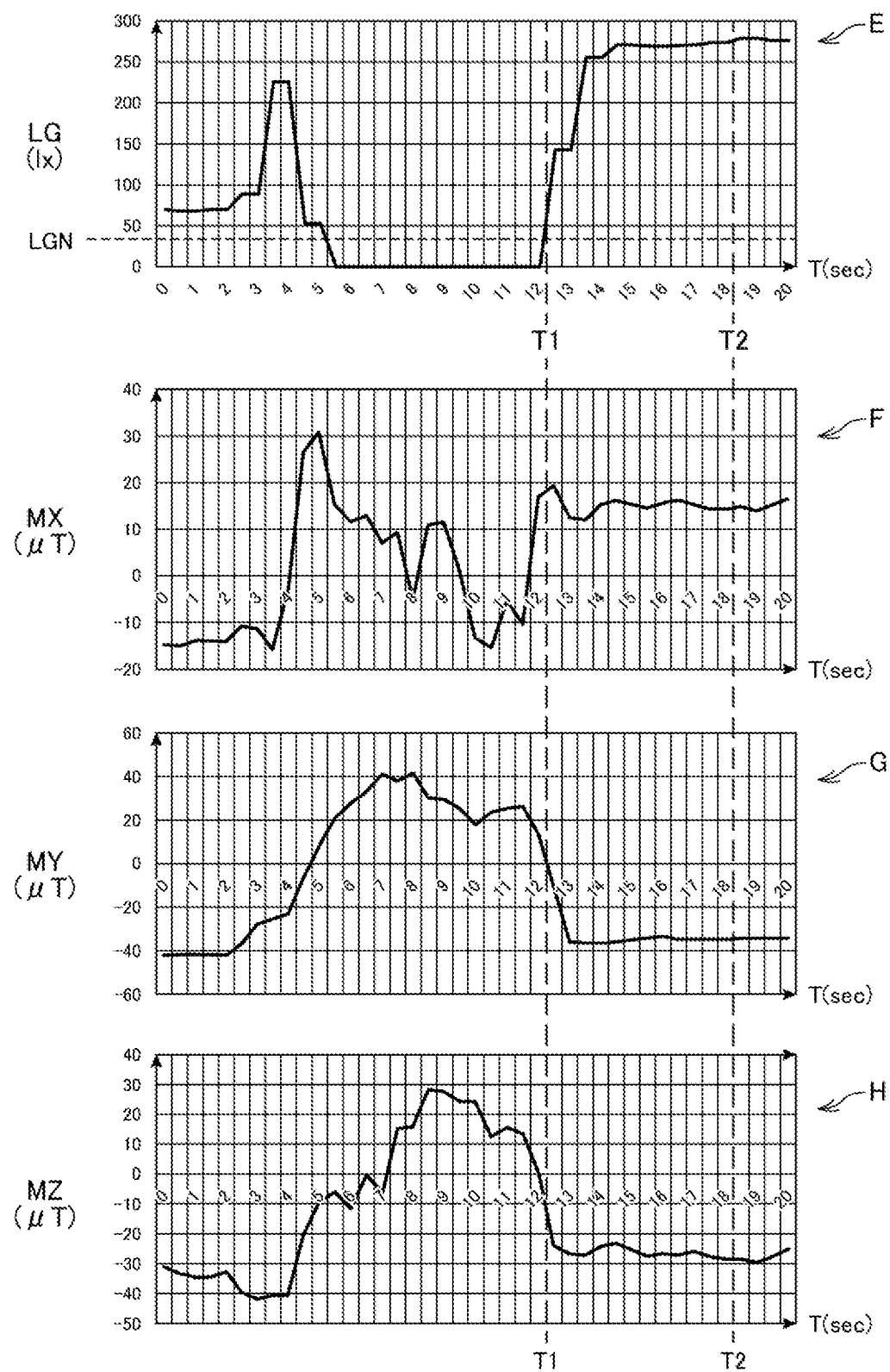
FIG. 8 is a diagram illustrating an example of a detection result of a magnetic sensor.

FIG. 8 is a diagram illustrating an example of the detection results of the first illuminance sensor 353 and the first magnetic sensor 352.

The horizontal axis of the graph indicated by each of sign E in FIG. 8, sign F in FIG. 8, sign G in FIG. 8, and sign H in FIG. 8 indicates time T. The vertical axis of the graph of the sign E in FIG. 8 indicates the illuminance LG. The vertical axis of the graph of the sign F in FIG. 8 indicates the magnetic MX in the X-axis direction. The vertical axis of the graph of the sign G in FIG. 8 indicates the magnetic MY in the Y-axis direction. The vertical axis of the graph of the sign H in FIG. 8 indicates the magnetic MZ in the Z-axis direction.

As illustrated in the graph of the sign E in FIG. 8, at time T1, the illuminance LG is not less than the threshold illuminance LGN. The threshold illuminance LGN is, for example, 30lx (lux). At a time prior to time T1, the illuminance LG is zero. In the present exemplary embodiment, at a time prior to the time T1, the smartphone 300 is stored in the user's pocket and the smartphone 300 is taken out of the pocket at the time T1.

As illustrated in the graph of the sign E in FIG. 8, the illuminance LG increases from the time T1. The user takes out the smartphone 300 from the pocket into a room where a fluorescent lamp is arranged on a ceiling. Immediately after the smartphone 300 is taken out from the pocket, the normal direction of the display panel 331 is facing in the horizontal direction. Further, the first illuminance sensor 353 receives the outside light from the normal direction of the display panel 331. Therefore, immediately after the smartphone 300 is taken out, the illuminance LG is small.

Thereafter, to operate the touch sensor 332 of the smartphone 300, the user changes the posture of the smartphone 300 such that the normal direction of the display panel 331 of the smartphone 300 faces upward. As a result, the illuminance LG increases.

As illustrated in the graph of the sign F in FIG. 8, at time T2, the magnetic MX increases. At the time T2, the user touching the touch sensor 332 of the smartphone 300, thus the posture of the smartphone 300 changes and the magnetic MX increases.

As illustrated in the graph of the sign G in FIG. 8, between the time T1 and the time T2, the magnetic MY rapidly increases immediately after time T1, and the subsequent change is small. As illustrated in the graph of the sign H in FIG. 8, between the time T1 and the time T2, the magnetic MZ rapidly decreases immediately after time T1, and the subsequent change is small. Such changes in the magnetic MY and the magnetic MZ indicate the following operations for the user with respect to the smartphone 300.

That is, immediately after the user took out the smartphone 300 at the time T1, a preparatory operation of the user was performed to operate the touch sensor 332 of the smartphone 300. The preparation operation is an operation in which the user changes the posture of the smartphone 300 such that the normal direction of the display panel 331 of the smartphone 300 is facing the HMD 100.

From the illuminance LG detected by the first illuminance sensor 353 reaches the threshold illuminance LGN or greater until when the user starts the position input operation, the first execution unit 311 acquires the detection result of the first magnetic sensor 352.

Specifically, the first execution unit 311 acquires the detection result of the first magnetic sensor 352 from the time T1 to the time T2. The time T1 indicates the time when the illuminance LG reaches the threshold illuminance LGN or greater. The time T2 indicates the time when the user starts the position input operation. The position input operation is, for example, a touch operation with respect to the touch sensor 332.

As described with reference to FIG. 7 and FIG. 8, from the illuminance LG detected by the first illuminance sensor 353 reaches the threshold illuminance LGN or greater until when the user starts the position input operation, the first execution unit 311 acquires the detection result of the first sensor S1.

Specifically, the first execution unit 311 acquires the detection result of the first sensor S1 from the time T1 to the time T2. The time T1 indicates the time when the illuminance LG reaches the threshold illuminance LGN or greater. The time T1 is determined based on the detection result of the first illuminance sensor 353. The time T2 indicates the time when the user starts the position input operation. The time T2 is determined based on the detection result of the touch sensor 332.

2-2. Detection Result of Second Sensor

Figure 9:
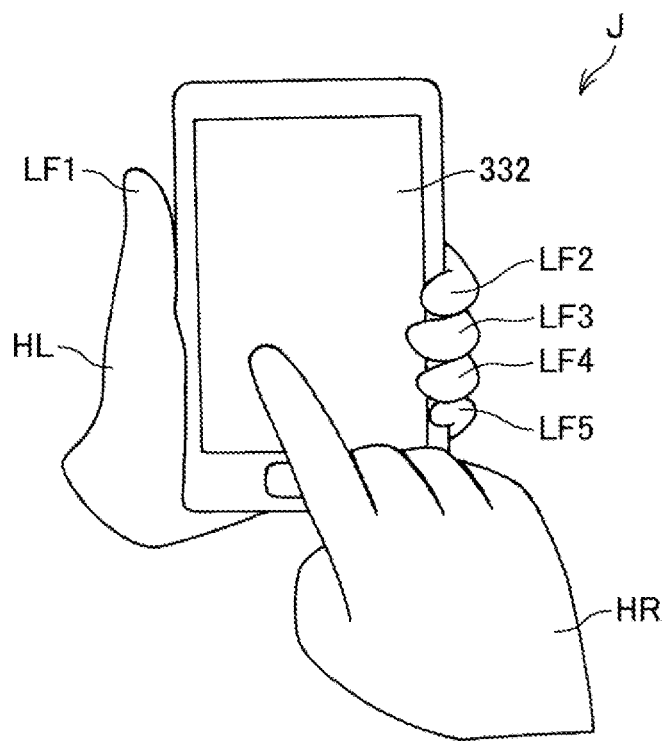
FIG. 9 is a diagram illustrating an example of a position of a user's finger grasping the smartphone.
Figure 9:
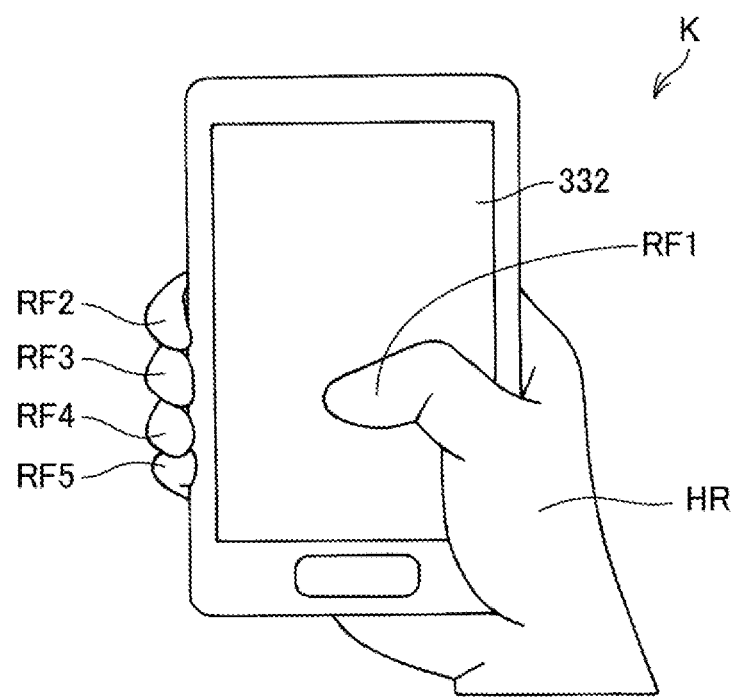

FIG. 9 is a diagram illustrating an example of a position where the user's finger grasping the smartphone 300.

Sign J in FIG. 9 is a diagram illustrating an example of the finger position where the user's left hand HL grasping the smartphone 300 when the user manipulates the touch sensor 332 with the right hand HR.

Sign K in FIG. 9 indicates a diagram illustrating an example of the finger position where the user's right hand HR grasping the smartphone 300 when the user grasps the smart phone 300 with the right hand HR and manipulates the touch sensor 332 with the thumb RF1 of the right hand HR.

As illustrated in the diagram of the sign J in FIG. 9, the thumb LF1 of the left hand HL abuts the long side direction of the left side of a housing of the smartphone 300. The abutting position of the thumb LF1 with the housing of the smartphone 300 is the center in the long side direction of the left side of the housing of the smartphone 300.

Each of the index finger LF2, the middle finger LF3, the ring finger LF4, and the little finger LF5 of the left hand HL abut along the long side direction of the right side of the housing of the smartphone 300. Each of the index finger LF2, the middle finger LF3, the ring finger LF4 and the little finger LF5 is aligned along the long side direction of the right side of the housing of the smartphone 300.

The abutting position of the index finger LF2 with the housing of the smartphone 300 is the center in the long side direction of the right side of the housing of the smartphone 300. The abutting position of the smartphone 300 housing of the little finger LF5 is a lower portion in the long side direction of the right side of the housing of the smartphone 300. The abutting position of the middle finger LF and ring finger LF4 with the housing of the smartphone 300 is between the abutting position of the index finger LF2 with the housing of the smartphone 300 and the abutting position of the little finger LF5 with the housing of the smartphone 300. Each of the index finger LF2, the middle finger LF3, the ring finger LF4 and the little finger LF5 are in contact with each other.

As illustrated in the diagram of the sign K in FIG. 9, the position of the thumb RF1 of the right hand HR is on the touch sensor 332. That is, the user manipulates the touch sensor 332 with the thumb RF1 of the right hand HR.

The abutting position of the index finger RF2 of the right hand HR with the housing of the smartphone 300 is the center in the long side direction of the left side of the housing of the smartphone 300. The abutting position of the smartphone 300 housing of the little finger RF5 is a lower portion in the long side direction of the left side of the housing of the smartphone 300. The abutting position of the middle finger RF3 and ring finger RF4 with the housing of the smartphone 300 is between the abutting position of the index finger RF2 with the housing of the smartphone 300 and the abutting position of the little finger RF5 with the housing of the smartphone 300. Each of the index finger RF2, the middle finger RF3, the ring finger RF4 and the little finger RF5 are in contact with each other.

Note that, the right side of the housing of the smartphone 300 is in contact with the palm of the right hand HR.

The camera 61 images an external scene including the smartphone 300 and generates an external scene image. The first execution unit 311 detects the position of the user's finger grasping the smartphone 300 based on the external scene image. Specifically, the first execution 311 detects the positions of the thumb LF1, the index finger LF2, the middle finger LF3, the ring finger LF4 and the little finger LF5 of the left hand HL of the user, or the positions of the thumb RF1, the index finger RF2, the middle finger RF3, the ring finger RF4 and the little finger RF5 of the right hand HR, where the smartphone 300 is being grasped. Then, the first execution unit 311 executes personal authentication of the user based on the detection result of the position of the user's finger grasping the smartphone 300.

3. Processing of Accepting Unit

Figure 10:
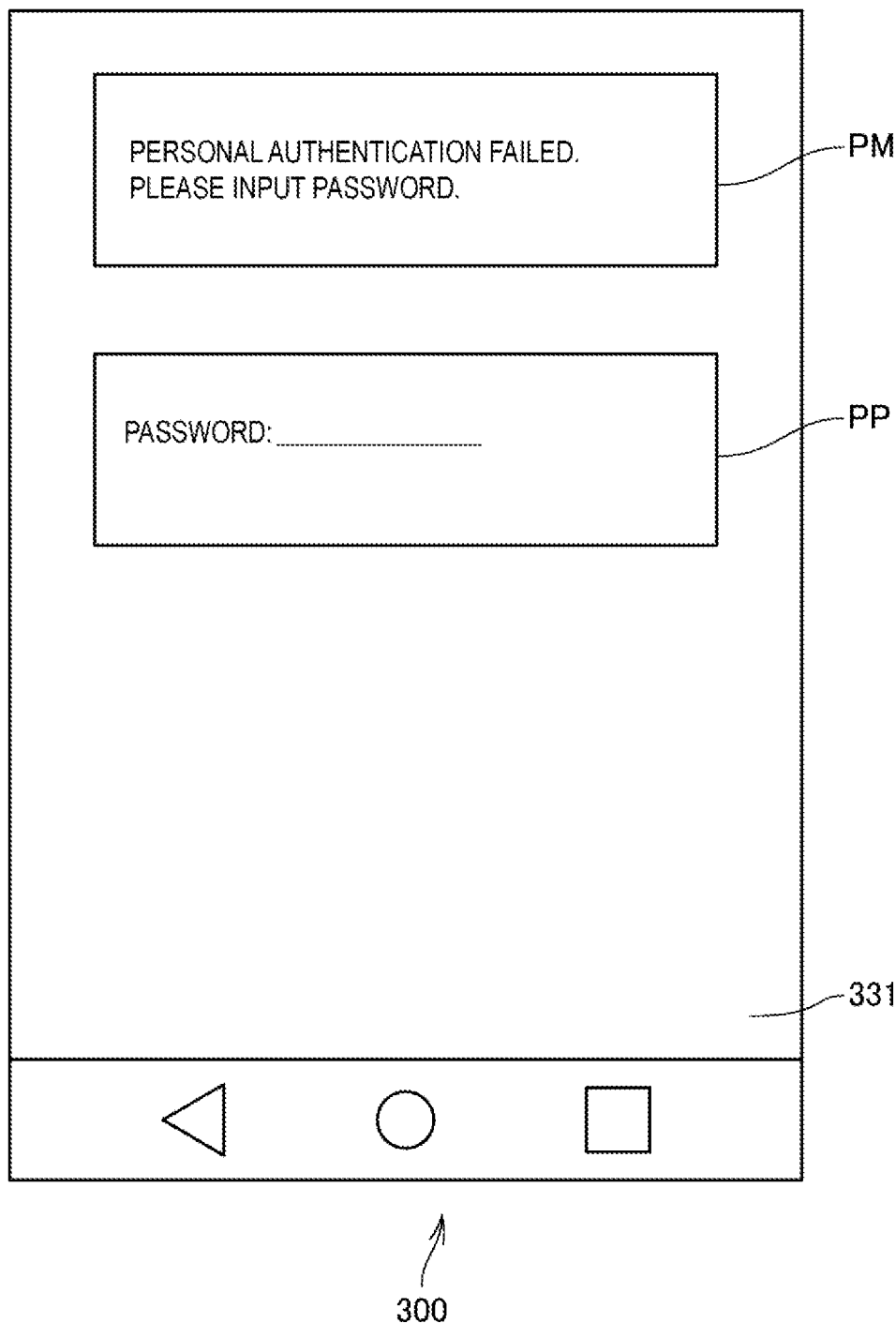
FIG. 10 is a screen view illustrating an example of a screen displayed when authentication fails.

FIG. 10 is a screen view illustrating an example of a code authentication screen displayed on the display panel 331 when the authentication fails.

As illustrated in FIG. 10, when the personal authentication of the user fails, the reception unit 313 displays the code authentication screen on the display panel 331. The code authentication screen includes a message display portion PM and a password input portion PP.

The message display portion PM displays a message instructing the user to input a password. Specifically, a character image of "Personal authentication failed. Please input a password" is displayed on the message display portion PM.

The password input portion PP displays a message instructing the user to accept input of a password. Specifically, a character image of "Password: _____" is displayed on the password input portion PP. Note that, the underlined range of the password input portion PP indicates a position where the input of a password is accepted. The password corresponds to an example of an "authentication code".

4. Description of Processing of First Control Unit of Smartphone

Figure 11:
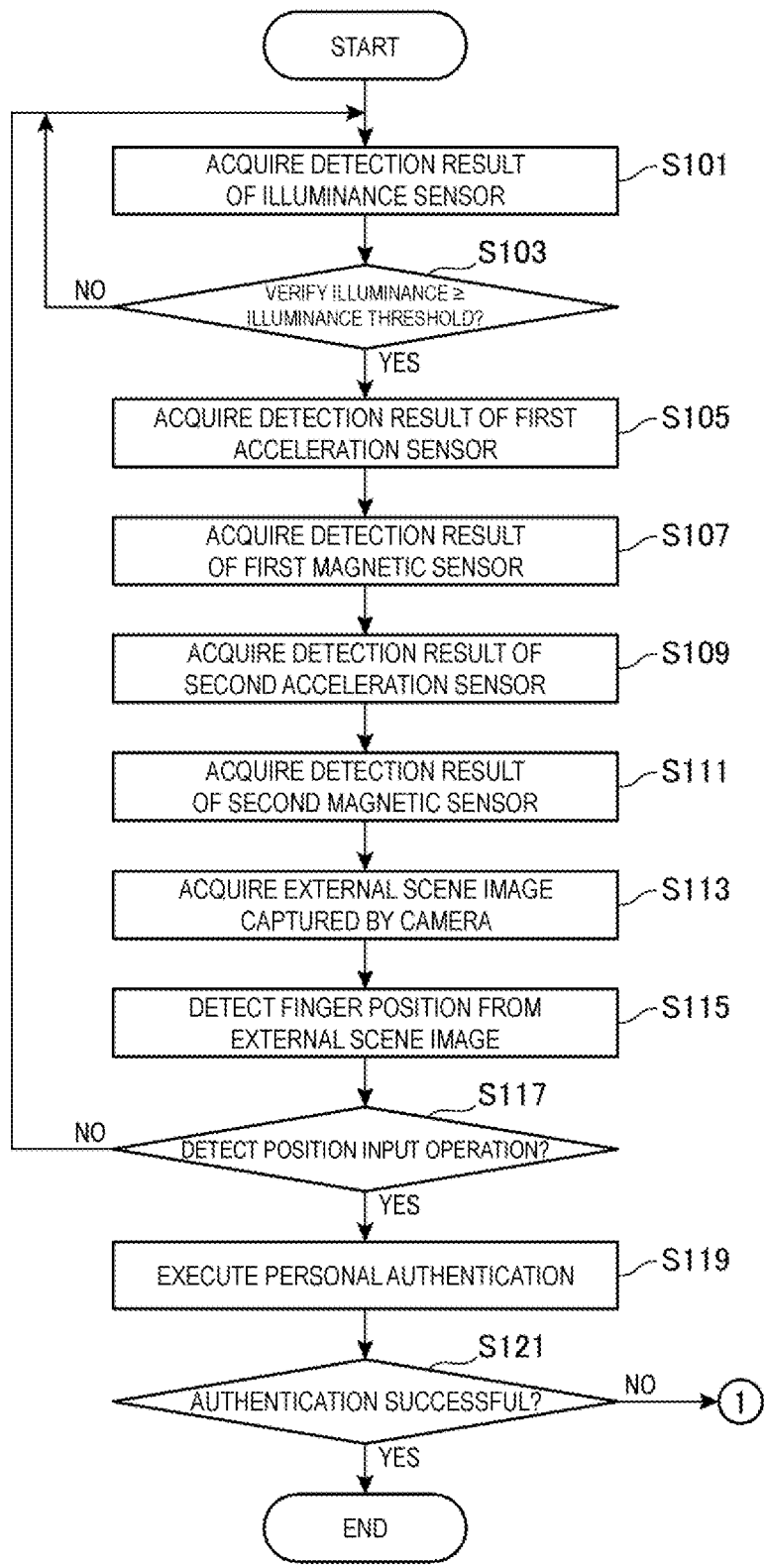
FIG. 11 is a flowchart illustrating a processing of the first control unit of the smartphone.
Figure 12:
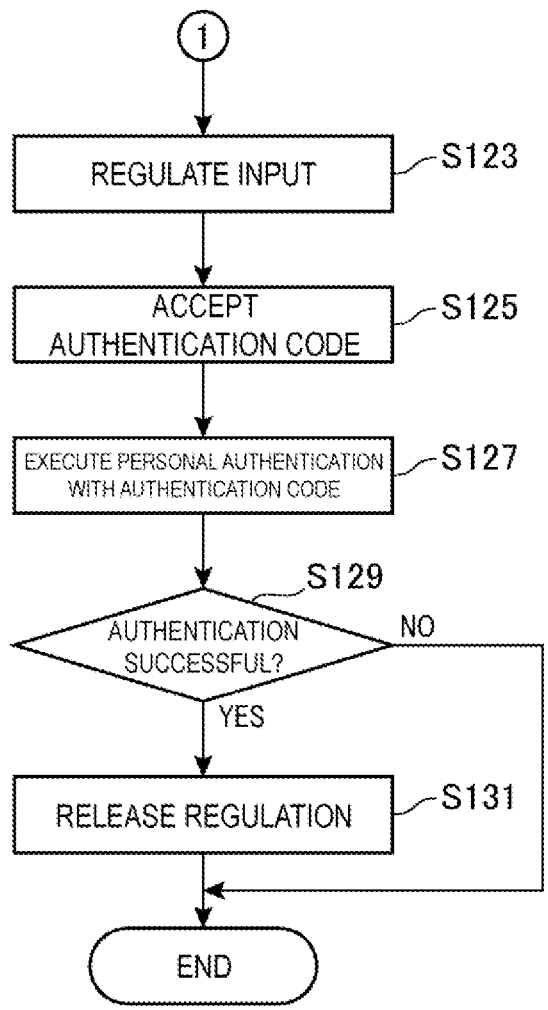
FIG. 12 is a flowchart illustrating the processing of the first control unit of the smartphone.

Each of FIG. 11 and FIG. 12 is a flowchart illustrating a processing of the first control unit 310 of the smartphone 300.

First, as illustrated in FIG. 11, in step S101, the first control unit 310 acquires the detection result of the first illuminance sensor 353.

Next, in step S103, the first control unit 310 determines whether the illuminance LG detected by the first illuminance sensor 353 is not less than the threshold illuminance LGN.

If the first control unit 310 determines that the illuminance LG detected by the first illuminance sensor 353 is less than the threshold illuminance LGN (step S103: NO), the process returns to step S101. If the first control unit 310 determines that the illuminance LG detected by the first illuminance sensor 353 is not less than the threshold illuminance LGN (step S103: YES), the process proceeds to step S105.

Then, in step S105, the first control unit 310 acquires the detection result of the first acceleration sensor. The first acceleration sensor indicates the three-axis acceleration sensors of the first six-axis sensor 351.

Next, in step S107, the first control unit 310 acquires the detection result of the first magnetic sensor 352.

Next, in step S109, the first control unit 310 acquires the detection result of the second acceleration sensor of the HMD 100. The second acceleration sensor indicates the three-axis acceleration sensors of the second six-axis sensor 235.

Next, in step S111, the first control unit 310 acquires the detection result of the second magnetic sensor 237 of the HMD 100.

Next, in step S113, the first control unit 310 acquires the external scene image captured by the camera 61 of the HMD 100.

Next, in step S115, the first execution unit 311 detects the position where the user's finger grasping the smartphone 300 from the external scene image.

Next, in step S117, the first control unit 310 determines whether a position input operation with respect to the touch sensor 332 is detected.

If the first control unit 310 determines that a position input operation with respect to the touch sensor 332 is not detected (step S117: NO), the process returns to step S101. If the first control unit 310 determines that a position input operation with respect to the touch sensor 332 is detected (step S117: YES), the process proceeds to step S119.

Then, in step S119, the first execution unit 311 executes personal authentication. Specifically, from the illuminance LG detected by the first illuminance sensor 353 reaches the threshold illuminance LGN or greater until when the user starts the position input operation with respect to the touch sensor 332, the first execution unit 311 executes personal authentication of the user based on the detection results of the first sensor S1 and the second sensor S2. The first sensor S1 includes the first illuminance sensor 353, the first six-axis sensor 351 and the first magnetic sensor 352. The second sensor S2 includes the camera 61, the second six-axis sensor 235 and the second magnetic sensor 237.

Next, in step S121, the first control unit 310 determines whether personal authentication by the first execution unit 311 is successful.

If the first control unit 310 determines that personal authentication by the first execution unit 311 is successful (step S121: YES), the process ends. If the first control unit 310 determines that the personal authentication by the first execution unit 311 fails (step S121: NO), the process proceeds to step S123 in FIG. 12.

Then, as illustrated in FIG. 12, in step S123, the regulating unit 312 regulates the input by the user to the display system 1.

Next, in step S125, the accepting unit 313 accepts an input of the authentication code from the user.

Next, in step S127, the second execution unit 314 executes personal authentication of the user based on the authentication code.

Next, in step S129, the first control unit 310 determines whether personal authentication by the second execution unit 314 is successful.

If the first control unit 310 determines that the personal authentication by the second execution unit 314 fails (step S129: NO), the process ends. If the first control unit 310 determines that personal authentication by the second execution unit 314 is successful (step S129: YES), the process proceeds to step S131.

Then, in step S131, the regulating unit 312 deregulates the input by the user to the display system 1. Thereafter, the process ends.

Note that, step S119 corresponds to an example of "execution step".

5. Effects of Exemplary Embodiment

As described above, in the present exemplary embodiment, the display system 1 includes a HMD 100 mounted on a head of a user and a smartphone 300 coupled to the HMD 100. The smartphone 300 includes a touch sensor 332 configured to accept a position input operation to detect coordinates of the operating position, a first sensor S1 configured to detect a motion of the user with respect to the smartphone 300, and a first execution unit 311 configured to execute personal authentication of the user based on the detection result of the first sensor S1 until the user starts the position input operation.

Therefore, the first execution unit 311 executes the personal authentication of the user based on the detection result of the first sensor S1 until the user starts the position input operation, thus, the time and labor required for the personal authentication of the smartphone 300 is reduced.

In addition, the smartphone 300 includes a regulating unit 312 configured to regulate the input by the user to the display system 1 when the personal authentication of the user by the first execution unit 311 fails.

Therefore, an unauthorized user can be regulated from using the display system 1.

In addition, the smartphone 300 further include an accepting unit 313 configured to accept an input of an authentication code when personal authentication of the user fails, and a second execution unit 314 configured to execute personal authentication of the user based on the authentication code. When the personal authentication of the user by the second execution unit 314 is successful, the regulating unit 312 releases regulation of the input by the user to the display system 1.

Therefore, even if the personal authentication based on the detection result of the first sensor S1 fails, the input to the display system 1 is permitted by inputting the authentication code. Therefore, the convenience for the user can be improved.

In addition, the smartphone 300 further includes a non-volatile storage unit 320 configured to store a profile data set of motions of the user with respect to the smartphone 300 detected by the first sensor S1, wherein the first execution unit 311 executes personal authentication of the user based on the profile data set.

Therefore, the personal authentication of the user is executed based on the detection results of the profile data set and the first sensor S1, thus the accuracy of personal authentication can be improved.

In addition, the smartphone 300 further include a machine-learning unit 315 configured to learn identification information of each of a plurality of users including the user based on a profile data set of motions with respect to the smartphone 300 of each of the plurality of users, an output unit 316 configured to output the identification information corresponding to the detection result of the first sensor S1 until the user starts the position input operation to the machine-learning unit 315, wherein the first execution unit 311 executes personal authentication of the user based on the identification information output by the output unit 316.

Therefore, the identification information corresponding to the detection result of the first sensor S1 is output to the machine-learning unit 315 until the user starts the position input operation, and the personal authentication of the user is executed based on the output identification information, thus the accuracy of the personal authentication can be improved.

Further, the first sensor S1 includes the first illuminance sensor 353, and the first execution unit 311 executes personal authentication of the user based on the detection result of the first sensor S1, from the illuminance LG detected by the first illuminance sensor 353 reaches the threshold illuminance LGN or greater until when the user starts the position input operation.

Therefore, from the illuminance LG detected by the first illuminance sensor 353 reaches the threshold illuminance LGN or greater until when the user starts the position input operation, the personal authentication of the user is executed based on the detection result of the first sensor S1, thus the accuracy of the personal authentication can be improved.

Further, the first sensor S1 includes at least one of an acceleration sensor, a gyro sensor, and a geomagnetic sensor, and the first sensor S1 detects a movement of the smartphone 300 until the user starts the position input operation.

Therefore, the movement of the smartphone 300 can be accurately detected until the user starts the position input operation. Thus, the accuracy of personal authentication can be improved.

Further, the HMD 100 includes a second sensor S2 configured to detect a motion of the user with respect to the smartphone 300, and the first execution unit 311 executes personal authentication of the user based on the detection result of the first sensor S1 and the detection result of the second sensor S2.

Therefore, the personal authentication of the user is executed based on the detection result of the first sensor S1 and the detection result of the second sensor S2, thus the accuracy of personal authentication can be improved.

Further, the second sensor S2 includes at least one of an acceleration sensor, a gyro sensor, and a geomagnetic sensor, and the second sensor S2 detects a motion of the head of the user U.

Therefore, the second sensor S2 detects the movement of the head of the user U, and the personal authentication of the user is executed based on the detection result of the second sensor, thus the accuracy of personal authentication can be improved.

Further, the second sensor S2 includes a camera 61 configured to image an external scene, the first execution unit 311 detects the position where the user's finger is grasping the smartphone 300 based on the image generated by the camera 61.

Therefore, the first execution unit 311 can execute the personal authentication of the user based on the position of the user's finger grasping the smartphone 300. Thus, the accuracy of personal authentication can be improved.

6. Other Exemplary Embodiments

The present disclosure is not limited to the configurations in the exemplary embodiment described above, and can be implemented in various aspects without departing from the gist of the disclosure.

For example, in the exemplary embodiment described above, an "information processor" is, but is not limited to, the smartphone 300. The "information processor" is configured to be portable by a user and may be include a display unit, a position input unit, a sensor detecting a motion of the user with respect to the information processor, and a control unit. For example, the "information processor" may be a PDA terminal or a tablet personal computer.

Further, in the exemplary embodiment described above, the first control unit 310 includes the first execution unit 311, the regulating unit 312, the accepting unit 313, the second execution unit 314, the machine-learning unit 315, and the output unit 316, but the present disclosure is not limited to this configuration. The second control unit 120 may include at least one of the first execution unit 311, the regulating unit 312, the accepting unit 313, the second execution unit 314, the machine-learning unit 315, and the output unit 316.

Further, in the exemplary embodiment described above, the first execution unit 311 executes personal authentication of the user based on the detection result of the first sensor S1, from the illuminance LG detected by the first illuminance sensor 353 reaches the threshold illuminance LGN or greater until when the user starts the position input operation, but the present disclosure is not limited to this. The first execution unit 311 may execute personal authentication of the user based on the detection result of the first sensor S1 until the user starts the position input operation with respect to the touch sensor 332. For example, the first execution unit 311 may execute personal authentication of the user based on the detection result of the first sensor S1 for a predetermined period until the user starts the position input operation with respect to the touch sensor 332. The predetermined period is, for example, 10 seconds.

Further, in the exemplary embodiment described above, the configuration in which the coupling device 10 is coupled to the image display unit 20 by wire is illustrated, however, the present disclosure is not limited to this, and the image display unit 20 may be configured to be coupled wirelessly to the coupling device 10.

Further, the smartphone 300 may include a nine-axis IMU in which the first six-axis sensor 351 and the first magnetic sensor 352 are integrated. Similarly, the HMD 100 may include a nine-axis IMU in which the second six-axis sensor 235 and the second magnetic sensor 237 are integrated.

Further, a part of the functions of the coupling device 10 may be provided in the image display unit 20, the coupling device 10 may be realized by a plurality of devices. For example, instead of the coupling device 10, a wearable device that can be mounted to the body or clothes of the user, or to the personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiment described above, the configuration in which the image display unit 20 and the coupling device 10 are separated, and are coupled via the coupling cable 40 has been illustrated as an example. The present disclosure is not limited to this, and a configuration mounted on a head of the user in which the coupling device 10 and the image display unit 20 are integrally formed may also be used.

Further, in the exemplary embodiment described above, the configuration in which the user views an external scene through a display unit is not limited to a configuration where the right light-guiding plate 26 and the left light-guiding plate 28 transmit outside light. For example, the present disclosure is applicable to a display device configured to display an image in a state where an external scene cannot be visually recognized. Specifically, the present disclosure can be applied to a display apparatus configured to display images captured by the camera 61, images and CG (Computer Graphics) generated based on the captured images, and movies based on the movie data stored beforehand, or the movie data input from outside. This kind of display device can include a so-called closed type display device in which an external scene cannot be visually recognized. For example, with a configuration in which composite images created by combining together images of an external scene captured by the camera 61, and display images are displayed by the image display unit 20, even if the image display unit 20 may not transmit outside light, the external scene and images can be displayed such that the user can visually recognize. Of course, it is also possible to apply the present disclosure to such a so-called video see-through display apparatus.

Additionally, instead of the image display unit 20, for example, an image display unit of another type such as an image display unit worn as a hat may be adopted, as long as the image display unit includes a display unit configured to display an image in correspondence to the left eye of a user, and a display unit configured to display an image in correspondence to the right eye of the user. Additionally, the display device may be configured, for example, as an HMD mounted on a vehicle such as a car and an airplane. Further, the display device may be configured, for example, as an HMD built into a body protector tool such as a helmet. In this case, a positioning portion to be positioned on a body of the user, and a portion to be positioned to the positioning portion may be regarded as a mounting portion.

A configuration in which a virtual image was formed by the half mirrors 261 and 281 on a part of the right light-guiding plate 26 and the left light-guiding plate 28 was illustrated as an optical system configured to guide imaging light to the eyes of the user. The present disclosure is not limited to this, and an image may be displayed either on the entire surface of the right light-guiding plate 26 and the left light-guiding plate 28, or in a display region having an area that occupies most part of the right light-guiding plate 26 and the left light-guiding plate 28. In such a case, a process for downscaling the image may be included in an operation for changing the display position of the image.

In addition, the optical elements are not limited to the right light-guiding plate 26 and the left light-guiding plate 28 having half mirrors 261 and 281, and any optical components that allow the imaging light to enter the eyes of the user, specifically, diffraction grating, prisms, and holographic display units may be employed.

In addition, such a configuration may be adopted that at least some of the function blocks illustrated in FIG. 4 and FIG. 5 and the like are achieved with hardware, or achieved together with hardware and software, and the present disclosure is not limited to a configuration in which independent hardware resources are arranged as illustrated in the figures.

Further, the control program executed by the first control unit 310 may be stored in the non-volatile storage unit 320 or another storage unit in the first control unit 310. Further, a configuration may be adopted that programs stored in external devices may be acquired via the communication unit 345 and the like to be executed.

Further, a duplicate of a configuration formed in the coupling device 10 may be formed in the image display unit 20. For example, a processor similar to the processor of the coupling device 10 may be arranged in the image display unit 20, or the processor of the coupling device 10 and the processor of the image display unit 20 may be configured to separately perform functions.

For example, processing units in the flowchart illustrated in FIG. 11 and FIG. 12 are divided according to the main processing contents in order to facilitate the understanding of the processing in the first control unit 310 of the smartphone 300. The exemplary embodiment is not limited by the way or the name dividing the processing units illustrated in the flowchart in FIG. 11 and FIG. 12. Further the processing of the first control unit 310 can be divided into more processing units in accordance with a processing content, and can be divided such that one processing unit includes more processing. An order of the processing in the above-described flowchart is also not limited to the illustrated example.

Further, the control method of the smartphone 300 can be realized by causing the computer included in the smartphone 300 to execute the control program corresponding to the control method of the smartphone 300. Furthermore, the control program can also be recorded in a recording medium so as to be readable by a computer. The recording medium can be a magnetic recording medium, an optical recording medium, or a semiconductor memory device. Specifically, a portable or stationary type recording medium, such as a flexible disk, a Compact Disk Read Only Memory (CD-ROM), a Digital Versatile Disk (DVD), a Blu-ray (registered trademark) disc, a magneto-optical disc, a flash memory, a card type recording medium, or the like may be exemplified. The recording medium may be non-volatile storage devices such as a RAM, a ROM, and a HDD, all representing internal storages included in an image display apparatus. Further, the control program corresponding to the control method of the smartphone 300 is stored in a server apparatus or the like, and thus the control method of the smartphone 300 can be realized by downloading the control program from the server apparatus to the smartphone 300.

What is claimed is:

1. A display system for use with a user, the display system comprising:
    a display device mounted on a head of the user, the display device including an imaging sensor;
    a terminal including:
        a first sensor configured to detect a motion of the terminal,
        a position input sensor configured to receive a position input operation from the user, and
        an illuminance sensor configured to detect an illuminance; and
    a processor operatively coupled to the display device, the processor being programmed to:
        determine the illuminance to have reached a threshold illuminance or greater,
        after the illuminance has reached the threshold illuminance or greater, determine, via the first sensor, an orientation of the terminal as facing toward to the display device,
        after the determining the orientation of the terminal to be facing toward the display device, start the position input operation on the terminal to authenticate the user, and
        detect a finger of the user grasping the terminal based on an image generated by the imaging sensor after the orientation of the terminal is determined to be facing toward the display device and before the position input operation is started.

2. The display system according to claim 1, wherein the processor is programmed to:
    regulate an input by the user to the display system when the authentication of the user by the processor fails.

3. The display system according to claim 2, wherein the processor is further programmed to:
    accept an input of an authentication code when personal authentication of the user fails; and
    execute personal authentication of the user based on the authentication code, and
    when the personal authentication of the user is successful, the processor releases regulation of the input by the user to the display system.

4. The display system according to claim 1, further comprising:
    a memory storing a profile data set of motions of the user as detected by the first sensor, and
    the processor executes personal authentication of the user based on the profile data set.

5. The display system according to claim 1, wherein the processor is further programmed to:
    learn identification information of each of a plurality of users including the user, based on a profile data set of motions of each of the plurality of users as detected by the first sensor;
    output identification information corresponding to a detection result of the first sensor until the user starts the position input operation; and
    execute personal authentication of the user based on the output identification information.

6. The display system according to claim 1, wherein the first sensor detects a movement of the processor until when the user starts the position input operation.

7. A non-transitory computer-readable storage medium storing a control program for a processor operatively coupled to a display device that includes an imaging sensor and is mounted on a head of a user, the control program causing the processor to perform steps comprising:
    receiving, from a first sensor in a terminal, a detection result of detecting a motion of the terminal;
    detecting an illuminance by way of an illuminance sensor;
    determining the illuminance to have reached a threshold illuminance or greater;
    after the illuminance has reached the threshold illuminance or greater, determining an orientation of the terminal as facing toward to the display device by using the first sensor;
    after the determining the orientation of the terminal to be facing toward the display device, start a position input operation on the terminal to authenticate the user; and
    detect a finger of the user grasping the terminal based on an image generated by the imaging sensor after the orientation of the terminal is determined to be facing toward the display device and before the position input operation is started.

8. A control method for a processor operatively coupled to a display device that includes an imaging sensor and is mounted on a head of a user, the control method comprising:
    receiving, from a first sensor in a terminal, a detection result of detecting a motion of the terminal;
    detecting an illuminance by way of an illuminance sensor;
    determining the illuminance to have reached a threshold illuminance or greater;
    after the illuminance has reached the threshold illuminance or greater, determining an orientation of the terminal as facing toward the display device using the first sensor;
    after the determining the orientation of the terminal to be facing toward the display device, start a position input operation on the terminal to authenticate the user; and
    detect a finger of the user grasping the terminal based on an image generated by the imaging sensor after the orientation of the terminal is determined to be facing toward the display device and before the position input operation is started.

* * * * *